(12) United States Patent
Takamatsu et al.

(10) Patent No.: US 6,308,405 B1
(45) Date of Patent: *Oct. 30, 2001

(54) PROCESS FOR PREPARING AN ELECTRODE SUBSTRATE

(75) Inventors: Osamu Takamatsu, Atsugi; Katsunori Hatanaka, Yokohama; Kiyoshi Takimoto, Kawasaki; Haruki Kawada; Ken Eguchi, both of Yokohama; Yuko Morikawa, Kawasaki; Hiroshi Matsuda, Isehara; Toshihiko Takeda; Yoshihiro Yanagisawa, both of Atsugi; Hisaaki Kawade, Yokohama; Hideyuki Kawagishi, Ayase, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,784

(22) Filed: Nov. 10, 1997

Related U.S. Application Data

(62) Division of application No. 08/330,608, filed on Oct. 28, 1994, which is a continuation of application No. 07/975,138, filed on Nov. 12, 1992, which is a continuation of application No. 07/651,631, filed on Feb. 6, 1991, now abandoned.

(30) Foreign Application Priority Data

| Feb. 7, 1990 | (JP) | 2-027738 |
|---|---|---|
| Mar. 9, 1990 | (JP) | 2-056518 |
| Mar. 9, 1990 | (JP) | 2-056519 |
| Mar. 14, 1990 | (JP) | 2-061166 |
| Mar. 15, 1990 | (JP) | 2-062525 |
| Mar. 16, 1990 | (JP) | 2-063971 |
| Mar. 19, 1990 | (JP) | 2-066805 |
| Mar. 23, 1990 | (JP) | 2-072185 |
| Mar. 26, 1990 | (JP) | 2-073450 |
| Mar. 27, 1990 | (JP) | 2-075763 |
| Jul. 30, 1990 | (JP) | 2-199251 |
| Jul. 30, 1990 | (JP) | 2-199252 |
| Jul. 31, 1990 | (JP) | 2-201157 |

(51) Int. Cl.[7] ................................. H05K 3/36
(52) U.S. Cl. .................... 29/830; 29/825; 205/68; 205/78
(58) Field of Search ............... 29/830, 825, 846; 205/67, 68, 69, 76, 78; 445/46

(56) References Cited

U.S. PATENT DOCUMENTS

| 4,575,822 | 3/1986 | Quate | 369/126 |
|---|---|---|---|
| 4,586,980 | 5/1986 | Hirai et al. | 156/655 |

(List continued on next page.)

FOREIGN PATENT DOCUMENTS

| 0241934 | 10/1987 | (EP) . |
|---|---|---|
| 0275881 | 1/1988 | (EP) . |

(List continued on next page.)

OTHER PUBLICATIONS

Journal of Vacuum Science and Technology, vol. 6, No. 2, Mar./Apr. 1988, pp. 537–539, U. Staufer et al., "Surface Modification in the Nanometer Range by the Scanning Tunneling Microscope".

(List continued on next page.)

Primary Examiner—Lee Young
Assistant Examiner—Rick Kiltae Chang
(74) Attorney, Agent, or Firm—Fitzpatrick, Cella, Harper & Scinto

(57) ABSTRACT

An electrode substrate and a recording medium having a smooth surface with surface unevenness of 1 nm or less and a size of 1 $\mu m\square$ or more are disclosed. An electrode substrate and a recording medium having a concave-shaped groove for tracking on the surface, which groove has a depth which can detect of the tunnel current from the bottom thereof by a probe electrode for scanning the surface are also disclosed. Information processing devices equipped with the smooth recording medium, an electroconductive probe arranged approximate to the recording medium and a pulse voltage application circuit for recording are also disclosed.

4 Claims, 16 Drawing Sheets

U.S. PATENT DOCUMENTS

| | | | |
|---|---|---|---|
| 4,826,732 | 5/1989 | Kazan et al. | 369/126 |
| 4,842,917 | 6/1989 | Ohno et al. | 428/141 |
| 4,852,075 | 7/1989 | Feyrer et al. | 369/111 |
| 4,889,988 | 12/1989 | Elings | 250/306 |
| 4,894,537 | 1/1990 | Blackford et al. | 250/306 |
| 4,916,002 | 4/1990 | Carver et al. | 408/105 |
| 5,047,633 | 9/1991 | Finlan et al. | 250/306 |
| 5,061,438 * | 10/1991 | Lillie et al. | 419/8 |
| 5,206,665 | 4/1993 | Kawade et al. . | |
| 5,396,483 | 3/1995 | Matsuda et al. . | |
| 5,623,476 | 4/1997 | Eguchi et al. . | |

FOREIGN PATENT DOCUMENTS

| | | | |
|---|---|---|---|
| 0300419 | 7/1988 | (EP) | B05D/1/20 |
| 305033 | 3/1989 | (EP) . | |
| 0412850 | 8/1990 | (EP) | G11B/7/00 |
| 61-080536 | 4/1986 | (JP) . | |
| 0129543 | 6/1988 | (JP) . | |
| 63-161552 | 7/1988 | (JP) . | |
| 63-161553 | 7/1988 | (JP) . | |
| WO88/04470 | 6/1988 | (WO) | H01J/37/317 |

OTHER PUBLICATIONS

Applied Physics Letters, vol. 51, No. 4, Jul. 27, 1987, pp. 244–246, U. Stauffer et al., Nanometer Scale Structure Fabrication With the Scanning Tunneling Microscope.

Helvetica Physica Acta, vol. 55, No. 6, 1982, G. Binnig et al., "Scanning Tunneling Microscopy".

Patent Abstracts of Japan, vol. 13, No. 502 (P–958), Nov. 13, 1989 & JP–A–01 201 842 (Toppan Printing Co.), Aug. 14, 1989.

Patent Abstracts of Japan, vol. 7, No. 074 (M–203), Mar. 26, 1983 & JP–A–58 003 822 (Toshiba Denki K.K.) Jun. 21, 1983.

Patent Abstracts of Japan, vol. 7, No. 205 (C–185), Sep. 9, 1983 & JP–A–58 104 190 (Toshiba Denki K.K.) Jun. 21, 1983.

Patent Abstracts of Japan, vol. 5, No. 88 (P–65) (760), Jun. 8, 1981 & JP–A–56 034 149 (Hitachi Maxell K.K.) Jun. 4, 1991.

Patent Abstracts of Japan, vol. 13, No. 254 (E–772), Jun. 13, 1989 & JP–A–01 053 592 (Toyobo Co., Ltd) Jan. 3, 1989.

Analytical Chemistry, vol. 60, No. 8, Apr. 15, 1988, pp. 751–758, Fu–Ren F. Fan et al. "Scanning Tunneling Microscopic Studies of Platinum Electrode Surfaces".

G. Binning et al., Surface Studies by Scanning Tunnelling Microscopy, Physical Review Letters, vol. 49, No. 1, Jul. 5, 1982.

Pack et al. Rev. Sci. Instrum. 58(11), pp. 2010–2017, Nov. 1987.

* cited by examiner

FREQUENCY

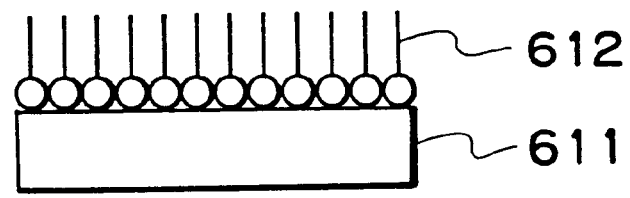
F I G. 14A
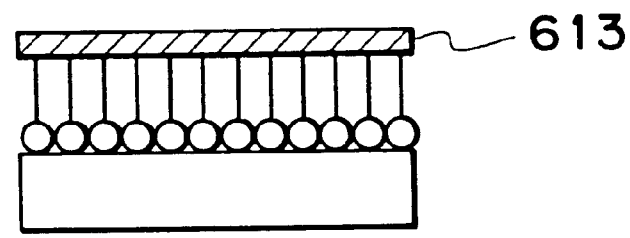
F I G. 14B
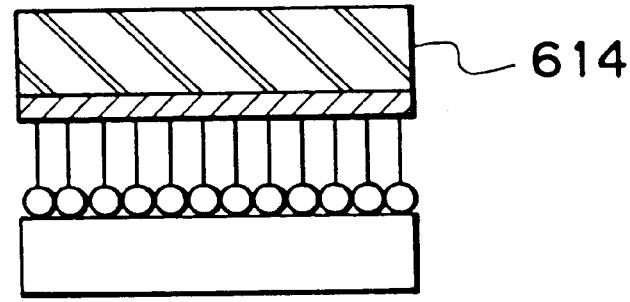
F I G. 14C
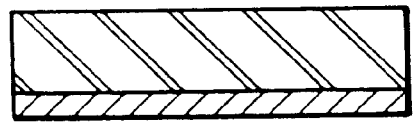
F I G. 14D

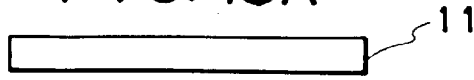
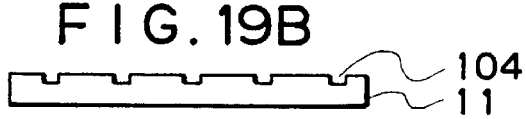
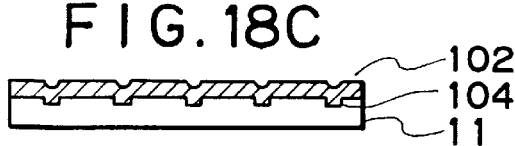
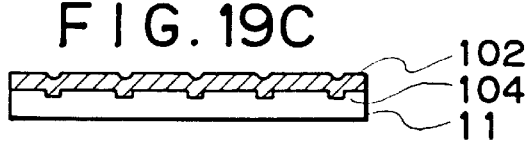
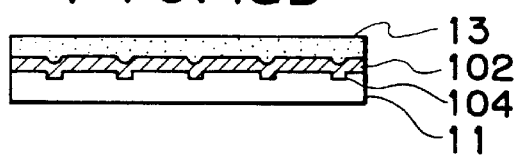
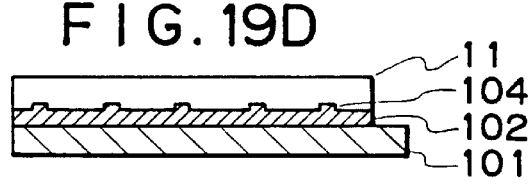
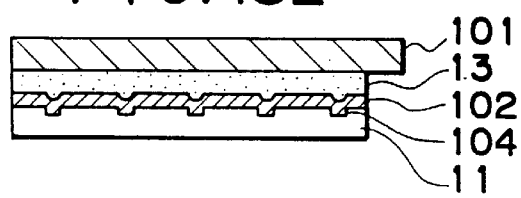
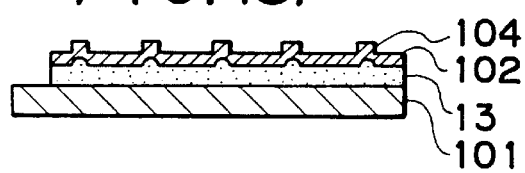
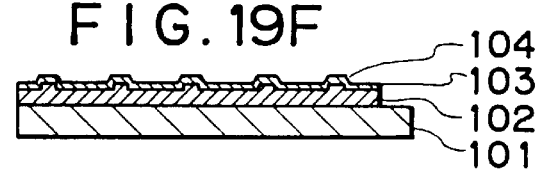
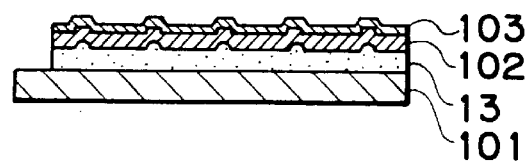

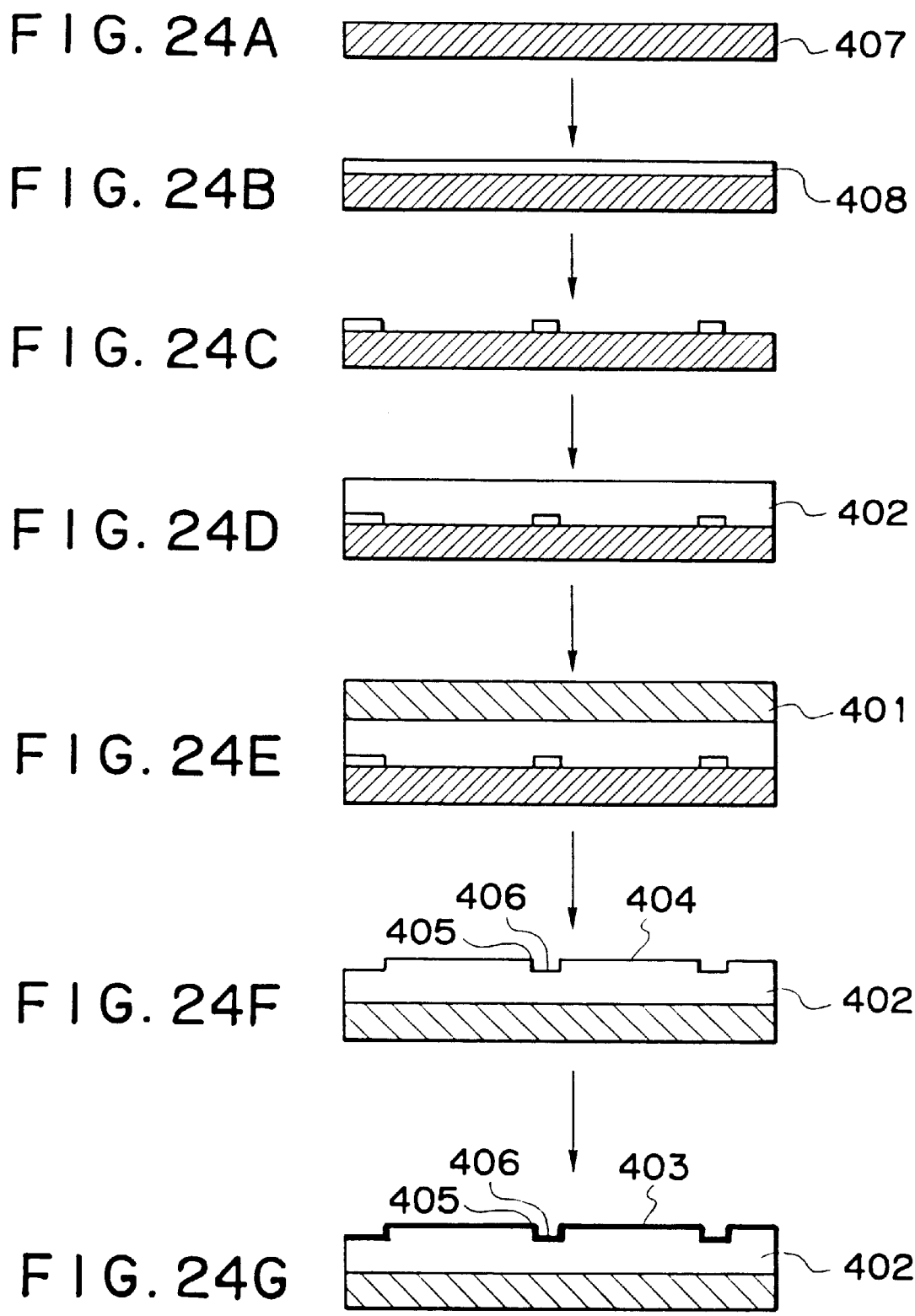

PROCESS FOR PREPARING AN ELECTRODE SUBSTRATE

This application is a division of application Ser. No. 08/330,608 filed Oct. 28, 1994, which is a continuation of application Ser. No. 07/975,138 filed Nov. 12, 1992, which is a continuation of application Ser. No. 07/651,631 filed Feb. 6, 1991, now abandoned.

BACKGROUND OF THE INVENTION

1. Field of the Invention

This invention relates to media such as recording medium, electrode substrate, etc., processes for producing these, recording device, the reproducing device which perform recording, reproducing with a probe electrode by use of such recording media, information processing devices including recording reproducing devices, and information processing methods including recording method, recording-reproducing method, recording-reproducing erasing method.

2. Related Background Art

In recent years, use of memory materials is at the center of electronics industries such as computers and their related instruments, video disc, digital audio disc, etc., and developments of such materials have been progressed extremely actively. The performances demanded for memory materials depend on the uses, but may generally include:

(1) high density and large recording capacity;
(2) rapid response speed of recording and reproducing;
(3) small consumption power;
(4) high productivity and low cost, etc.

Up to date, there have been semiconductor memory and magnetic memory utilizing magnetic materials or semiconductors as the base material, but with the progress of laser techniques in recent years, inexpensive and high density recording media by optical memory with the use of organic thin films such as of organic dyes, photopolymers, etc., have been launched in the field.

On the other hand, recently, a scanning tunnel microscope (hereinafter abbreviated as STM) which can directly observe the electron structure of the surface atoms of a conductor has been developed (G. Binnig et al., Phys. Rev. Lett., 49, 57 (1982)), and it has become possible to perform measurement of real space images with high resolving power regardless of whether they may be single crystals or amorphous, and still having the advantage that observation is possible at low power without causing a damage with current to the sample. Further, it can be actuated in the air and used for various materials, and therefore a wide range of applications have been expected therefor.

STM utilizes the phenomenon that a tunnel current flows when a probe of a metal (probe electrode) and an electroconductive substance are approached to a distance of about 1 nm with a voltage applied therebetween. Such current is very sensitive to the distance change between the two. By scanning the probe so as to constantly maintain the tunnel current, various information concerning the whole electronic cloud in the real space can be read. In this case, the resolving power in the interplanar direction is about 0.1 nm.

Therefore, by applying the principle of STM, it is possible to perform high density recording and reproducing sufficiently at atomic order (sub-nanometer). For example, in the recording and reproducing device disclosed in Japanese Laid-open Patent Publication No. 61-80536, the atomic particles adsorbed onto the medium surface are removed by electron beam, etc., writing is effected and the data are reproduced by STM.

There has been proposed the method of performing recording and reproducing by STM with the use of a thin film layer of a material having the memory effect of the switching characteristics of voltage and current, such as π electron type organic compound or a chalcogenide compound (Japanese Laid-open Patent Applications Nos. 63-161552, 63-161553). According to this method, if the bit size of recording is made 10 nm, high capacity recording and reproducing as much as $10^{12}$ bit/cm$^2$ are possible.

FIG. 7 shows a constitutional example of the information processing device in which STM is applied. In the following, description is made by referring to the Figure.

101 is a substrate, 102 an electrode layer of a metal, and 103 a recording layer. 201 is an XY stage, 202 a probe electrode, 203 a support for the probe electrode, 204 a Z-axis linear actuator for driving the probe electrode in the Z direction, 205, 206 are linear actuators for driving the XY stage in the directions X, Y, respectively and 207 is a pulse voltage circuit.

301 is an amplifier for detecting the tunnel current flowing from the probe electrode 202 through the recording layer 103 to the electrode layer 102. 302 is a logarithmic reducer for converting the change in tunnel current to a value proportional to the gap distance between the probe electrode 202 and the recording layer 103, 303 a low region passing filter for extraction of the surface unevenness component of the recording layer 103. 304 is an error amplifier for detecting the error between the reference voltage $V_{REF}$ and the output from the low region passing filter 303, 305 a driver for driving the Z-axis linear actuator 204. 306 is a driving circuit for performing positional control of the XY stage 201. 307 is a high region passing filter for separating the data component.

FIG. 8A shows a sectional view of the recording medium of the prior art example and the tip of the probe electrode 202.

401 is the data bit recorded on the recording layer 103, and 402 is the crystal grain when the electrode layer 102 is formed on the substrate 101. The size of the crystal grain 402 is about 30 to 50 nm by use of conventional vacuum vapor deposition method, sputtering method, etc. as the preparation method of the electrode layer 102.

The gap between the probe electrode 202 and the recording layer 103 can be kept constant by the circuit constitution shown in FIG. 7. More specifically, by detecting the tunnel current flowing between the probe electrode 202 and the recording layer 103, and the value after passing the current through the logarithmic reducer 302 and low region passing filter 303 is compared with the reference voltage, and by controlling the Z-axis linear actuator 204 supporting the probe electrode 202 so that the comparative value approaches zero, the gap between the probe electrode 202 and the recording layer 103 can be made substantially constant.

Further, by driving the XY stage 201, whereby the surface of the recording medium is traced with the probe electrode 202, and the high region frequency component of the signal at the ⓐ point in FIG. 7 to enable detection of the data in the recording layer 103.

FIG. 9A shows the signal intensity spectrum for the frequency of the signal at the ⓐ point at this time.

The signals of the frequency components of $f_o$ or less are due to gentle undulation of the medium on account of warping, distortion, etc. of the substrate 101. This signal with $f_1$ as the center is due to unevenness of the surface of the recording layer 103, primarily on account of the crystal grain 402 formed during formation of the electrode material. $f_2$ is the conveying wave component of the recording data, and 403 the data signal band. $f_3$ is the signal component formed from the atomic, molecular arrangement in the recording layer 103.

When the recording medium shown in the prior art example was used, the following problems were involved.

For performing high density recording by making available high resolving power, which is the specific feature of STM, the data signal band 403 must be placed between $f_1$ and $f_3$. In this case, for separating the data components, a high region passing filter 307 in FIG. 7 with a shielding frequency $f_c$ is employed. However, the tail portion of the signal component of $f_1$ overlaps the data signal band 403. This is because the signal component of $f_1$ is caused by the crystal grain 402 in the electrode layer 102, and the recording size and the bit interval of the data are approximately 1 to 10 nm as compared with the crystal grain 402 of 30 to 50 nm.

For this reason, when high recording and reproducing is conducted, S/N ratio of recording reproducing is lowered to make the error ratio of reading data markedly high.

FIG. 8B shows a sectional view of the recording medium having a track and the tip of the probe electrode 202. 104 is a track.

In FIG. 9B, $f_T$ is a tracking signal. Although not shown in the information processing device in FIG. 7, the tracking signal $f_T$ is a signal which makes it possible for the probe electrode 202 to monitor the data series, which is realized by forming a step difference on the medium or writing a signal which can be detected when it comes off from the track.

In the case of using the recording medium shown in the prior art example, the following problem was involved.

The tracking signal $f_T$ can be placed only in the vicinity of $f_o$. For this reason, the tracking signal $f_T$ will have a frequency considerably lower as compared with the data signal band 403, whereby the data monitoring will be lowered. This results in increased reading error ratio of the data, thus posing a problem that reliability during information processing is lowered.

SUMMARY OF THE INVENTION

Accordingly, an object of the present invention, in view of the tasks as described above, is to provide a recording medium which enables high S/N ratio, high speed reproducing, an electrode substrate to be used for such recording medium, an information processing device, and an information processing method by use of such recording medium.

Another object to the present invention is to provide a recording medium which is markedly lowered in error ratio of reading data by effecting sufficient improvement in S/N ratio, an electrode substrate to be used for such recording medium, an information processing device, and an information processing method by use of such recording medium.

Still another object of the present invention is to provide a recording medium which is improved in S/N ratio, markedly lowered in error ratio of reading data, and markedly improved in monitoring precision of tracking, an information processing device and an information processing method by use of such recording medium.

Still another object of the present invention is to provide a recording medium which can prevent damages of the recording surface, the probe electrode, etc. through contact of the probe electrode onto the recording surface, contact of a part of the track groove by maintaining the state with the feedback in the Z-axis direction applied by detecting the tunnel current even when the probe electrode may be slipped off from the recording surface position to be positioned above the track groove, thus detecting constantly the information of the height of the Z-axis of the probe electrode, and an information processing device by use of such recording medium, and further a process for preparing such recording medium, etc.

The above objects can be accomplished by the present invention as described below.

More specifically, the specific features of the present invention are first, an electrode substrate, having a smooth surface with surface unevenness of 1 nm or less and a size of 1 $\mu$m☐ (1 $\mu$m×1 $\mu$m) or more;

second, a process for preparing an electrode substrate, comprising the step of forming an electrode layer containing an electrode material on a matrix having a smooth surface with surface unevenness of 1 nm or less and a size of 1 $\mu$m☐ or more and the step of separating said electrode layer from the matrix;

third, a recording medium, having a smooth surface with surface unevenness of 1 nm or less and a size of 1 $\mu$m☐ or more;

fourth, a process for preparing a recording medium, comprising the step of forming an electrode layer containing an electrode material on a matrix having a smooth surface with a surface unevenness of 1 nm or less and a size of 1 $\mu$m☐ or more, the step of separating said electrode layer from the matrix and the step of forming a recording layer on said electrode layer;

fifth, an information processing device, equipped with a recording medium having a smooth surface with surface unevenness of 1 nm or less and a size of 1 $\mu$m☐ or more, an electroconductive probe arranged proximate to said recording medium and a pulse voltage application circuit for recording;

sixth, an information processing device, equipped with a recording medium having a smooth surface with surface unevenness of 1 nm or less and a size of 1 $\mu$m☐ or more, an electroconductive probe arranged proximate to said recording medium, a pulse voltage application circuit for recording and a bias voltage application circuit for reproducing;

seventh, an information processing device, equipped with a recording medium having a smooth surface with surface unevenness of 1 nm or less and a size of 1 $\mu$m☐ or more and comprising an information recorded thereon, an electroconductive probe arranged proximate to said recording medium and a bias voltage application circuit for reproducing;

eighth, an information processing method which comprises approaching an electroconductive probe to a recording medium having a recording layer on an electrode substrate and having a smooth surface with surface unevenness of 1 nm or less and a size of 1 $\mu$m☐ or more, and performing recording of an information by applying a pulse voltage between the electrode substrate and the electroconductive probe;

ninth, an information processing method which comprises approaching an electroconductive probe to a recording medium having a recording layer on an electrode substrate and having a smooth surface with surface unevenness of 1 nm or less and a size of 1 $\mu$m☐ or more, performing recording of information by applying a pulse voltage between the electrode substrate and the electroconductive probe and performing regeneration of the recorded information by applying a bias voltage;

tenth, an information processing method which comprises approaching an electroconductive probe to a recording medium having a recording layer on an electrode substrate and having a smooth surface with surface unevenness of 1 nm or less and a size of 1 $\mu m\square$ more, performing recording of information by applying a first pulse voltage between the electrode substrate and the electroconductive probe, performing regeneration of the recorded information by applying a bias voltage and performing erasing of the recorded information by further applying a second pulse voltage;

eleventh, an embedded electrode, which is an electrode embedded in a supporting substrate, a part of the surface of said electrode being exposed, and the difference of height of unevenness of said exposed surface being 1 nm or less, and the exposed surface and the surface of the supporting substrate being in the same plane;

twelfth, a process for preparing an embedded electrode, which comprises forming a metal thin film and an insulating thin film on a smooth surface substrate, further backing it with a solid supporting substrate and then peeling off said smooth surface substrate to form a smooth surface electrode with the smooth surface of said smooth surface substrate formed thereon;

thirteenth, a process for preparing a peeled film, which comprises forming a metal film on a smooth matrix surface and peeling off said metal film to obtain a film with smooth surface, or further forming a metal film on said metal film surface after having been peeled off and peeling off said metal film to form a metal film with smooth surface, wherein the film to be peeled formed on the matrix or the surface of the metal film is formed by use of the Langmuir-Blodgett's method;

fourteenth, an electrode substrate, having a smooth surface with surface unevenness of 1 nm or less and a size of 1 $\mu m\square$ more and a track;

fifteenth, a process for preparing an electrode substrate, comprising the step of forming a concave or convex shape on a matrix having a smooth surface with surface unevenness of 1 nm and a size of 1 $\mu m\square$ more, the step of forming an electrode layer containing an electrode material on said matrix and the step of separating said electrode layer from the matrix;

sixteenth, a recording medium, having a smooth surface with surface unevenness of 1 nm or less and a size of 1 $\mu m\square$ more and a track;

seventeenth, a process for preparing a recording medium, comprising the step of forming a concave or convex shape on a matrix having a smooth surface with surface unevenness of 1 nm or less and a size of 1 $\mu m\square$ more, the step of forming an electrode layer containing an electrode material on said matrix, the step of separating said electrode layer from the matrix and the step of forming a recording layer on said electrode layer;

eighteenth, an information processing device, equipped with a recording medium having a smooth surface with surface unevenness of 1 nm or less and a size of 1 $\mu m\square$ or more and a track, an electroconductive probe arranged proximate to said recording medium and a pulse voltage application circuit for recording;

ninteenth, an information processing device, equipped with a recording medium having a smooth surface with surface unevenness of 1 nm or less and a size of 1 $\mu m\square$ or more and a track, an electroconductive probe arranged proximate to said recording medium, a pulse voltage application circuit for recording and a bias voltage application circuit for reproducing;

twentieth, an information processing device, equipped with a recording medium having a smooth surface with surface unevenness of 1 nm or less and a size of 1 $\mu m\square$ or more and a track, comprising an information recorded thereon, an electroconductive probe arranged proximate to said recording medium and a bias voltage application circuit for reproducing;

twentyfirst, an information processing method which comprises approaching an electroconductive probe to a recording medium having a recording layer on an electrode substrate and having a smooth surface with surface unevenness of 1 nm or less and a size of 1 $\mu m\square$ or more, and a track, and performing recording of an information by applying a pulse voltage between the electrode substrate and the electroconductive probe;

twentysecond, an information processing method which comprises approaching an electroconductive probe to a recording medium having a recording layer on an electrode substrate and having a smooth surface with surface unevenness of 1 nm or less and a size of 1 $\mu m\square$ more, and a track, performing recording of an information by applying a pulse voltage between the electrode substrate and the electroconductive probe and performing regeneration of the recorded information by applying a bias voltage;

twentythird, an information processing method which comprises approaching an electroconductive probe to a recording medium having a recording layer on an electrode substrate and having a smooth surface with surface unevenness of 1 nm or less and a size of 1 $\mu m\square$ more, and a track, and performing recording of an information by applying a first pulse voltage between the electrode substrate and the electroconductive probe, performing regeneration of the recorded information by applying a bias voltage and performing erasing of the recorded information by further applying a second pulse voltage;

twentyfourth, an electrode substrate having a concave-shape track groove on the surface, said track groove having a depth which can detect the tunnel current from the track groove bottom by a probe electrode for scanning the surface;

twentyfifth, a recording medium according to claim 104, wherein said recording medium comprises a recording layer provided on the electrode substrate having a concave-shape track groove on the surface;

twentysixth, a recording information processing device, comprising a recording medium having a concave-shape track groove on the surface, said track groove having a depth which can detect the tunnel current from the track groove bottom by a probe electrode for scanning the surface, a probe electrode arranged proximate to said recording medium and a pulse voltage application circuit for recording;

twentyseventh, a recording information processing device, comprising a recording medium having a concave-shape track groove on the surface, said track groove having a depth which can detect the tunnel current from the track groove bottom by a probe electrode for scanning the surface, a probe electrode arranged proximate to said recording medium, a pulse voltage application circuit for recording and a bias voltage application circuit for reproducing;

twentyeighth, a recording information processing device, comprising a recording medium having a concave-shape track groove on the surface, said track groove having a depth which can detect the tunnel current from the track groove bottom by a probe electrode for scanning the surface, a probe electrode arranged proximate to said recording medium, a pulse voltage application circuit for recording/erasing and a bias voltage application circuit for reproducing;

twentyninth, a recording information processing device, comprising a recording medium having a concave-shape track groove on the surface, said track groove having a depth which can detect the tunnel current from the track groove bottom by a probe electrode for scanning the surface and also having an information recorded thereon, a probe electrode arranged proximate to said recording medium, a bias voltage application circuit for reproducing;

thirtieth, an information processing method, which comprises approximating a probe electrode to a recording medium comprising a recording layer provided on an electrode substrate having a concave-shape track groove on the surface, said track groove on the recording surface having a depth which can detect the tunnel current from the track groove bottom by a probe electrode for scanning the surface, applying a bias voltage between the probe electrode and the electrode surface to distinguish the recording surface and the track portion by the tunnel current, and applying a pulse voltage between the probe electrode and the electrode substrate to perform recording of an information on the recording surface;

thirtyfirst, an information processing method, which comprises placing a probe electrode proximate to a recording medium comprising a recording layer provided on an electrode substrate having a concave-shape track groove on the surface, said track groove on the recording surface having a depth which can detect the tunnel current from the track groove bottom by a probe electrode for scanning the surface, applying a bias voltage between the probe electrode and the electrode surface to distinguish the recording surface and the track portion by the tunnel current, applying a pulse voltage between the probe electrode and the electrode substrate to perform recording of an information on the recording surface, and applying a bias voltage between the probe electrode and the electrode substrate to reproduce the recording of the information;

thirtysecond, an information processing method, which comprises placing a probe electrode proximate to a recording medium comprising a recording layer provided on an electrode substrate having a concave-shape track groove on the surface, said track groove on the recording surface having a depth which can detect the tunnel current from the track groove bottom by a probe electrode for scanning the surface, applying a bias voltage between the probe electrode and the electrode surface to distinguish the recording surface and the track portion by the tunnel current, applying a pulse voltage between the probe electrode and the electrode substrate to perform recording of an information on the recording surface, applying a bias voltage between the probe electrode and the electrode substrate to reproduce the recording of the information, and applying a pulse voltage between the probe electrode and the electrode substrate to perform erasing of the recorded information;

thirtythird, a process for preparing an electrode substrate, comprising the step of forming an organic thin film on a substrate having 1 $\mu m\square$ more of a surface with unevenness of 1 nm or less, the step of irradiating an electron beam on said thin film followed by developing to form a pattern of said thin film, the step of forming an electrode layer comprising an electroconductive material on the substrate having said pattern, and the step of separating said substrate from the electrode layer, thereby obtaining an electrode substrate having a concave-shape track groove on the surface;

thirtyfourth, a process for preparing a recording medium, comprising the step of forming an organic thin film on a substrate having 1 $\mu m\square$ more of a surface with unevenness of 1 nm or less, the step of irradiating an electron beam on said thin film followed by developing to form a pattern of said thin film, the step of forming an electrode layer comprising an electroconductive material on the substrate having said pattern, and the step of separating said substrate from the electrode layer, and the step of forming a recording layer on the surface of the electrode layer facing said substrate, thereby obtaining a recording medium having a concave-shape track groove on the surface.

BRIEF DESCRIPTION OF THE DRAWINGS

FIGS. 14A–14D and FIGS. 15A–15D show various preparation steps of transfer duplication of smooth surface by peeling;

FIGS. 18A–18G to FIGS. 21A–21G are illustrations of preparation steps in the respective embodiments;

FIGS. 24A–24G show the preparation steps of the recording medium according to the present invention.

DETAILED DESCRIPTION OF THE PREFERRED EMBODIMENTS

Figure 1:
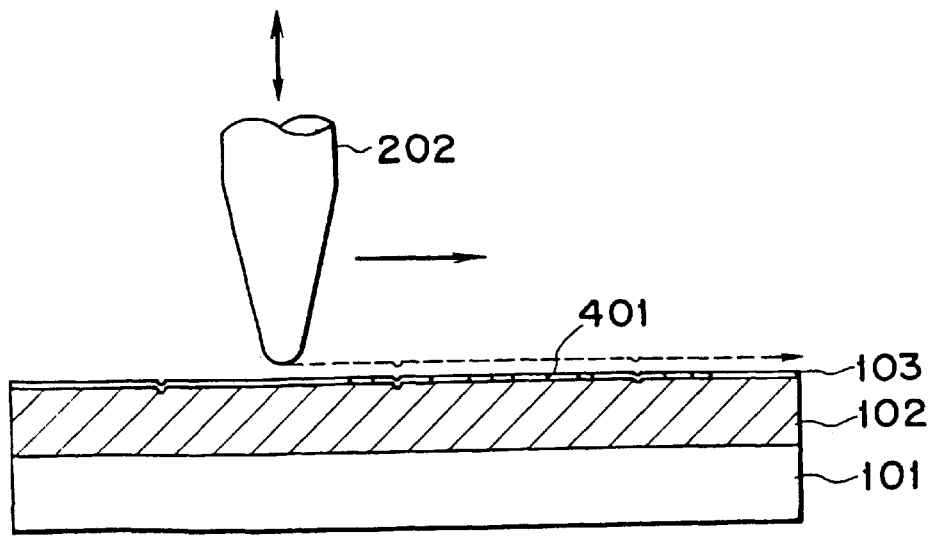
FIG. 1 is a schematic sectional view of the recording medium to be used in the present invention.

By providing a recording medium having a smooth surface according to the present invention, it has been made possible to make available the function of the information processing device by applying the principle of STM sufficiently.

In the following, the present invention is described by referring to the drawings.

FIG. 1 illustrates a schematic view of the recording medium according to the present invention. 101 is a substrate, 102 an electrode layer having smooth surface, 103 a recording layer, 202 a probe electrode and 401 represents data bit.

FIGS. 3A–3F illustrate a sectional view in the respective steps for preparation of the electrode substrate and recording medium according to the present invention.

Figure 3A:
FIGS. 3A–3F to FIGS. 6A–6E are illustrations of the preparation steps in the respective Examples.

In FIG. 3A, first a smooth substrate 11 is prepared. The smooth substrate requires a smooth surface with surface unevenness of 1 nm or less, preferably one having over 1 $\mu m\square$ more, preferably over 10 $\mu m\square$.

The surface unevenness can be measured by the method called AFM (Atomic-Force-Microscopy) which comprises approaching the tip of a fine probe to a sample substrate surface, measuring the atomic force acting between the tip atom of said fine probe and the atom on the sample substrate surface and observing the sample surface shape.

By use of such AFM, regardless of electroconductivity, insulating property of the sample, the surface shape of the sample can be measured at a resolving power of atomic order. The present inventors have evaluated the surfaces of various materials by use of AFM, and consequently found that the following materials are suitable as the smooth matrix 11 in the present invention.

(1) Cleaved surface of crystalline . . . cleaved surface of a crystal can easily give a very smooth surface and as the crystal material, mica, MgO, TiC, Si, HOPG, etc. may be included.

(2) Molten glass surface . . . for example, float glass, #7059 fusion, molten quartz, etc. may be included.

When the surface shapes of the above-mentioned materials were measured, the surface unevenness for all was 1 nm or less in the region of 10 $\mu m\square$ (10 $\mu m \times 10 \mu m$). Particularly, the mica cleaved surface is small in stepped difference at the lattice surface occurring during cleavage, with the unevenness at spatial frequency of $3.3 \times 10^5$ cm$^{-1}$ or less being 1 nm or less over a large area ($\geq$mm), and is therefore suitable as the smooth substrate to be used in the present invention.

Figure 3B:
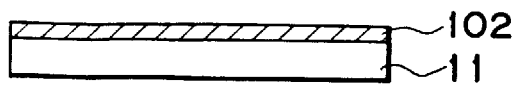

Next, as shown in FIG. 3B, an electrode layer 102 is formed on the smooth matrix 11. As the electrode layer 102 according to the present invention, a material having high electroconductivity and not good adhesion to the smooth matrix 11 is preferable. For example, noble metals such as Au, Ag, Pt, Pd, etc., alloys such as Au—Pd, Pt—Pd, etc., and laminated films of these may be included as well. As the electrode forming method using these materials, the thin film forming techniques known in the art are satisfactory.

Figure 3C:
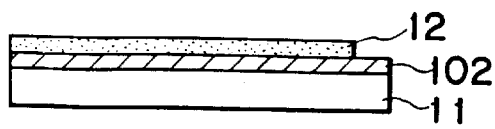

Next, as shown in FIG. 3C, on the electrode layer 102 is formed an adhesive layer 12. As the adhesive layer 12 according to the present invention, one of the non-solvent types with no volume shrinkage is preferable, as exemplified by insulating adhesives such as the epoxy resin type, the α-cyanoacrylate type, etc., electroconductive adhesives such as Epotech silver series, etc.

Figure 3D:
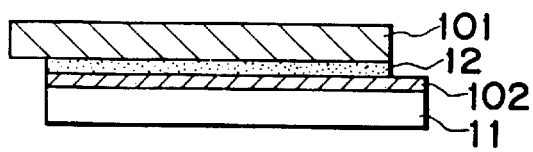

Next, as shown in FIG. 3D, on the adhesive layer 12 the substrate 101 is plastered. In this step, when the substrate 101 and the electrode layer 102 are directly bonded, for example, in the case of eutectic bonding, electroforming, etc., the adhesive layer 12 can be omitted. As the substrate 101 according to the present invention, when the adhesive layer 12 is interposed, any material of metal, glass, ceramics, plastic materials can be used. When bonded directly to the substrate 101, a relatively smooth material is preferred. Further, when the electrode layer 102 is thick, it is also possible to omit the substrate 101.

Figure 3E:
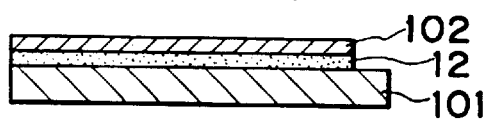

Next, as shown in FIG. 3E, by peeling off the smooth substrate 11 from the electrode layer 102, a smooth electrode substrate having 1 $\mu m\square$ more of smooth surface with surface unevenness of 1 nm or less can be formed.

Figure 3F:
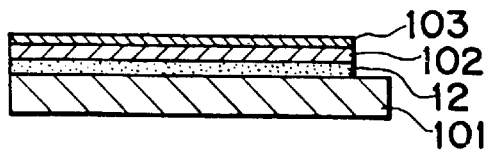

Next, as shown in FIG. 3F, by forming a recording layer 103 on the electrode layer 102 of the smooth electrode substrate, a recording medium is obtained.

Figure 11:
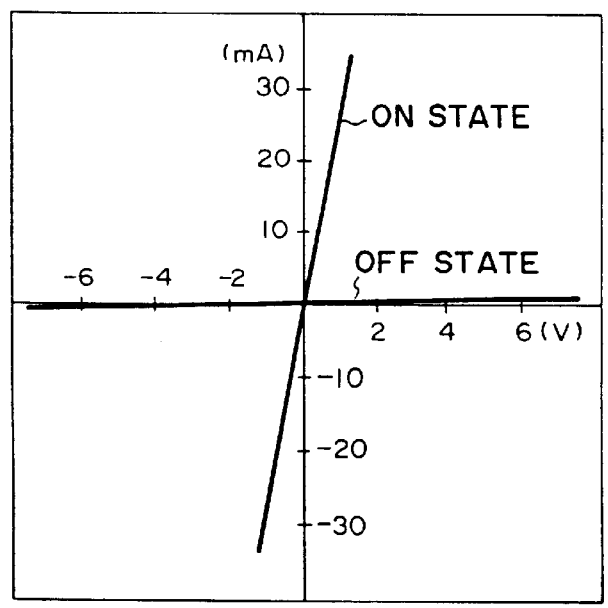
FIG. 11 is a current-voltage characteristic graph.

As the above-mentioned recording layer 103, it becomes possible to use a material having the memory switching phenomenon (electrical memory effect) in the current-voltage characteristics, for example, an organic monomolecular film or its built-up film having molecules with the group having only the conjugated π electron level and the group having only the σ electron level in combination laminated on the electrode. The electrical memory effect enables transition (switching) reversible to the low resistance state (ON state) and the high resistance state (OFF state) by applying a voltage exceeding the threshold value capable of transition of the above-mentioned organic monomolecular film or its built-up film, etc. to the states exhibiting 2 or more different electroconductivities under the state arranged between a pair of electrodes (FIG. 11, ON state, OFF state). Also, the respective states can be retained (memorized) even when application of the voltage may be stopped.

Since most of organic materials exhibit generally insulating or semiinsulating properties, various organic materials with the group having the conjugated π electron level are applicable in the present invention. Examples of the structure of the dye having suitable π electron systems for the present invention may include the dyes having porphyrin skeleton such as phthalocyanine, tetraphenylporphyrin, etc., azulene type dyes having squarylium group and croconicmethine group as the bonding chains and dyes analogous to cyanine type having two nitrogen containing heterocyclic groups such as quinoline, benzothiazole, benzooxazole, etc. bonded through squarylium group and croconicmethine group, or polymerized chain compounds of aromatic ring and heterocyclic compounds and fused polycyclic aromatic compounds such as cyanine dyes, anthracene and pyrene, etc., and polymers of diacetylene group, derivatives of tetracyanoquinodimethane or tetrathiafluvalene and analogues thereof and charge transfer complexes thereof, and still further metal complex compounds such as ferrocene, trisbipyridineruthenium complexes, etc.

The polymeric material suitable for the present invention may include biological polymers, for example, addition polymers such as polyacrylic acid derivatives, etc., condensed polymers such as polyimide, etc., ring-opened polymers such as nylon, etc.

Concerning formation of the above-mentioned recording layer 103, specifically application of the vapor deposition method or the cluster ion beam method is also possible, but from the standpoints of controllability, facility and reproducibility, the Langmuir-Blodgett's (LB) method is extremely suitable among the known prior arts.

According to the LB method, a monomolecular film of an organic compound having a hydrophobic site and a hydrophilic site in one molecule or its built-up film can be easily formed, and an organic ultra-thin film which has a thickness of molecular order and also uniform and homogeneous over large area can be stably supplied.

The LB method is a method which forms a monomolecular film or its built-up film by utilizing the fact that in a molecule with a structure having a hydrophilic site and a hydrophobic site (in molecule), when the balance between the two (amphiphilic balance) is adequately kept, the molecule becomes a layer of a single molecule with the hydrophilic group being directed downward on water surface.

As the group constituting the hydrophobic site, there may be included various hydrophobic groups generally widely known in the art such as saturated and unsaturated hydrocarbon groups, fused polycyclic aromatic groups and chain polycyclic phenyl groups, etc. These may each, individually or in a combination of a plurality thereof, constitute the hydrophobic site.

On the other hand, most representative of the constituent of the hydrophilic site are, for example, hydrophilic groups such as carboxyl group, ester group, acid amide group, imide group, hydroxyl group, further amino groups (primary, secondary, tertiary, quaternary, etc.) and others.

An organic molecule having these hydrophobic and hydrophilic groups with good balance can form a monomolecular film on water surface, and can be an extremely suitable material for the present invention.

The electrical memory effect of the compounds having the conjugated π electron system is observed for those with film thickness of some 10 nm or less, but the thicknesses may be preferably made 5 Å to 300 Å from the standpoint of film forming characteristics and uniformity.

Figure 2:
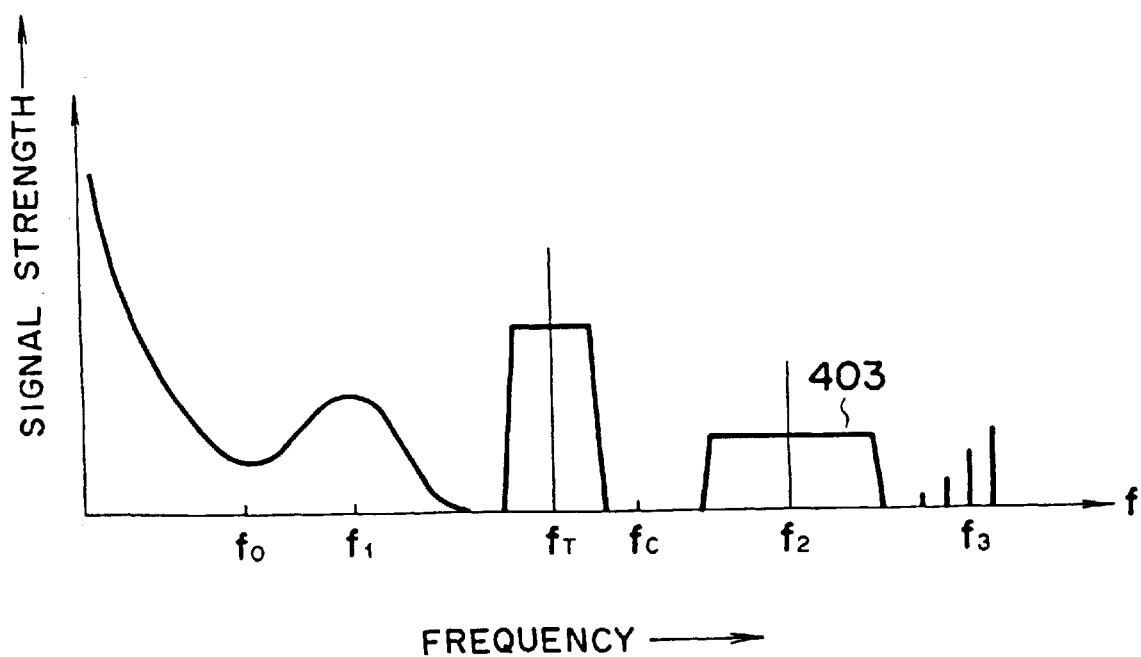
FIG. 2 is a diagram of the frequency spectrum of the reproduced signal of the present invention.
Figure 7:
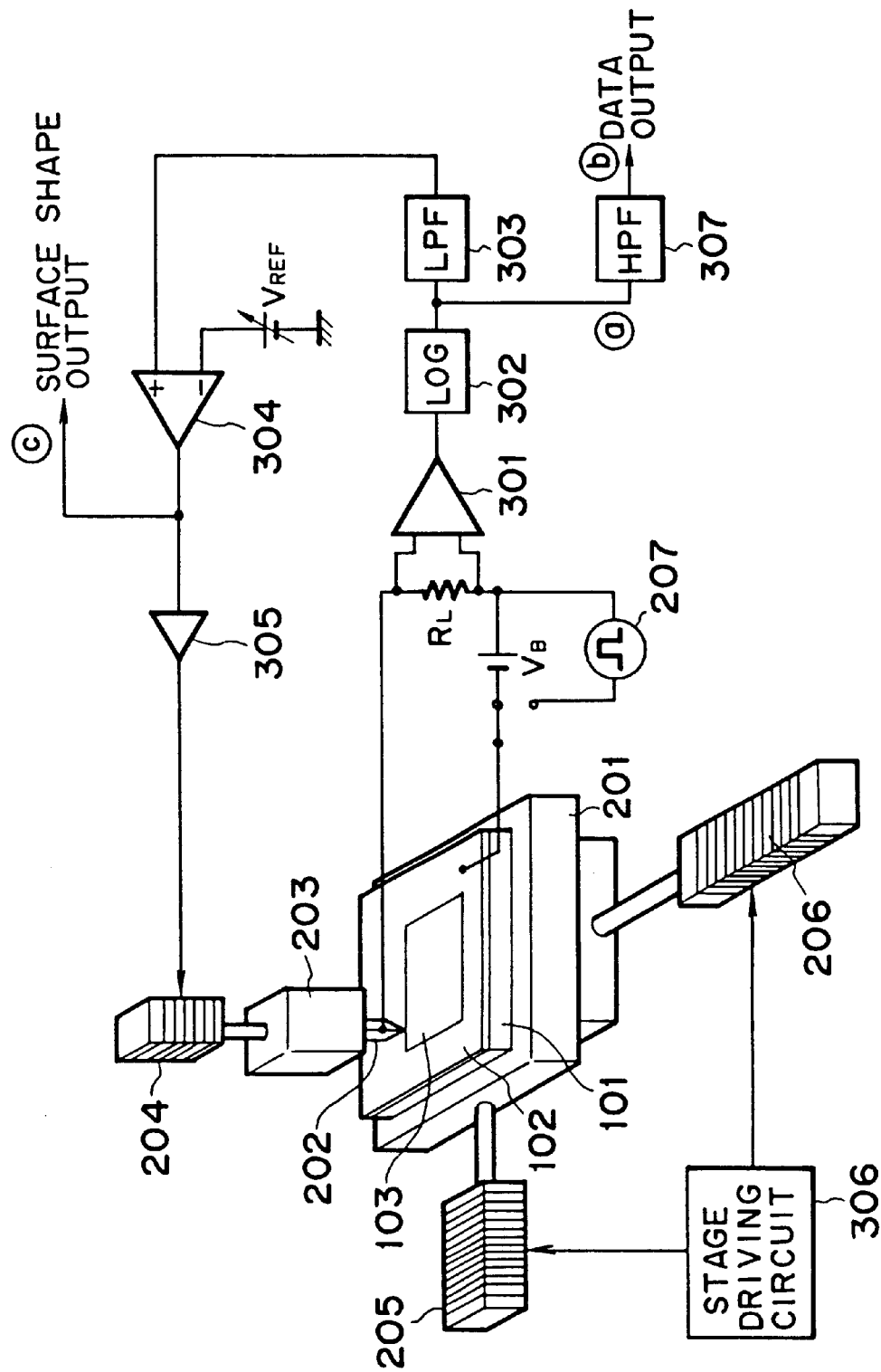
FIG. 7 is a constitutional view of the information processing device in which STM is applied.
Figure 8A:
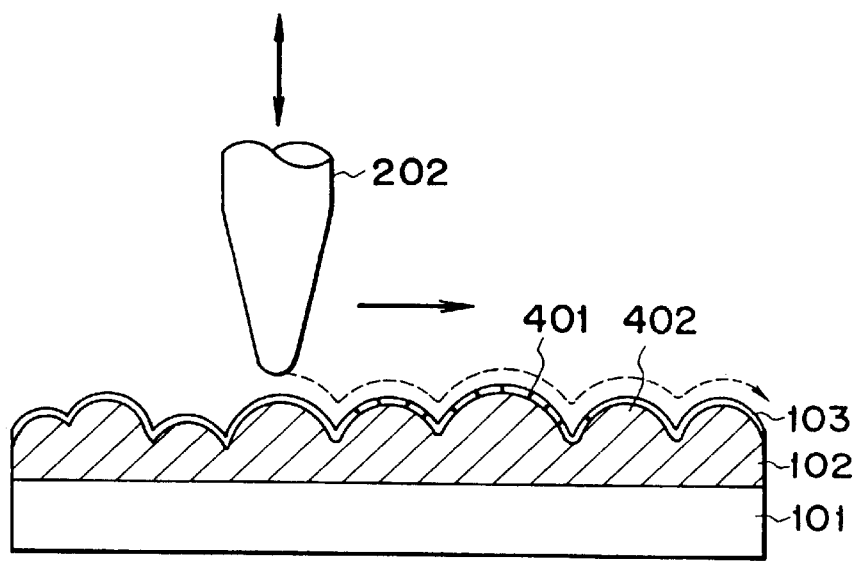
FIGS. 8A and 8B are schematic sectional views of the recording medium of the prior art example.
Figure 9A:
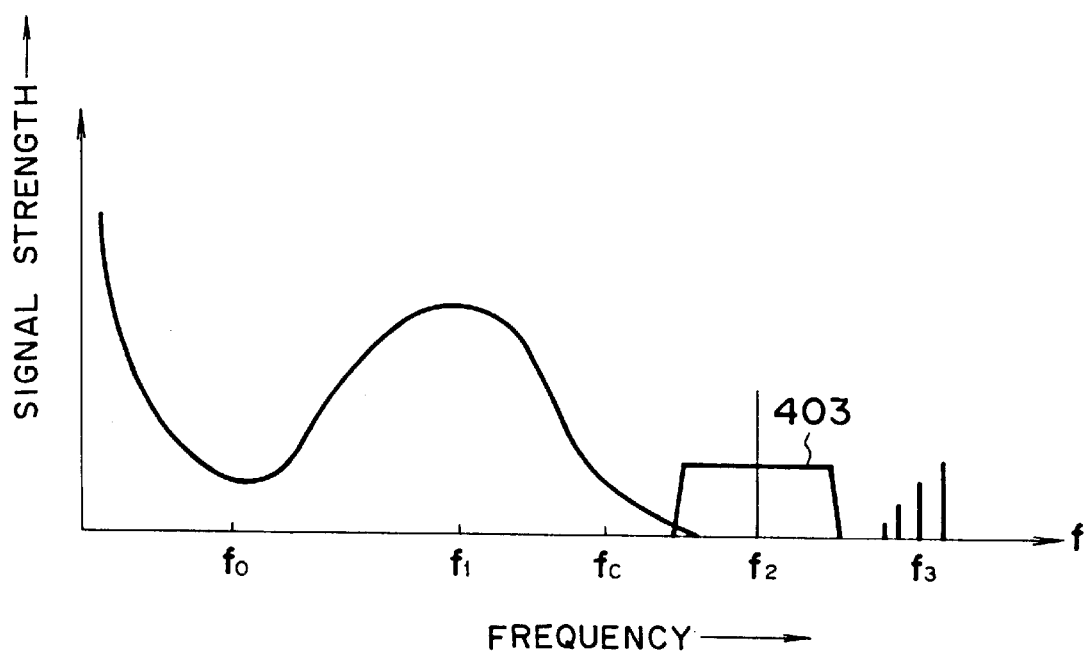
FIGS. 9A and 9B are diagrams of the frequency spectrum of the reproduced signal of the prior art example.
Figure 8B:
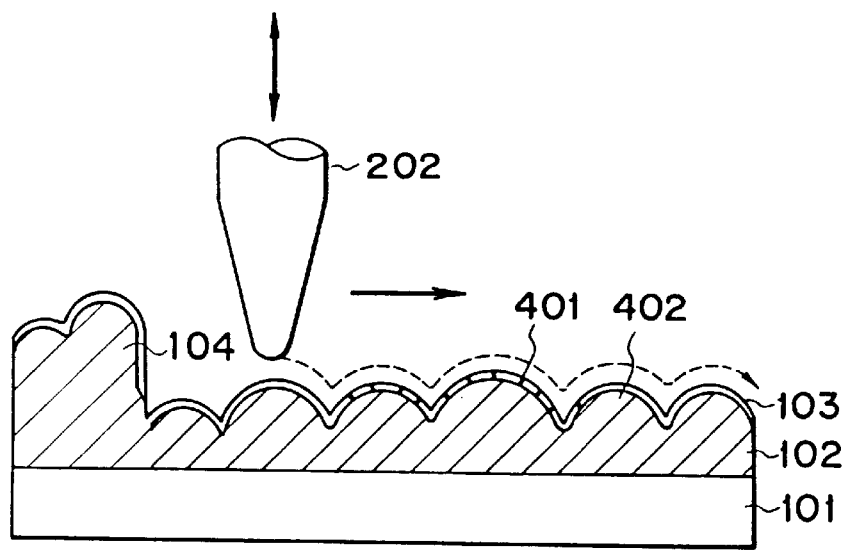
Figure 9B:
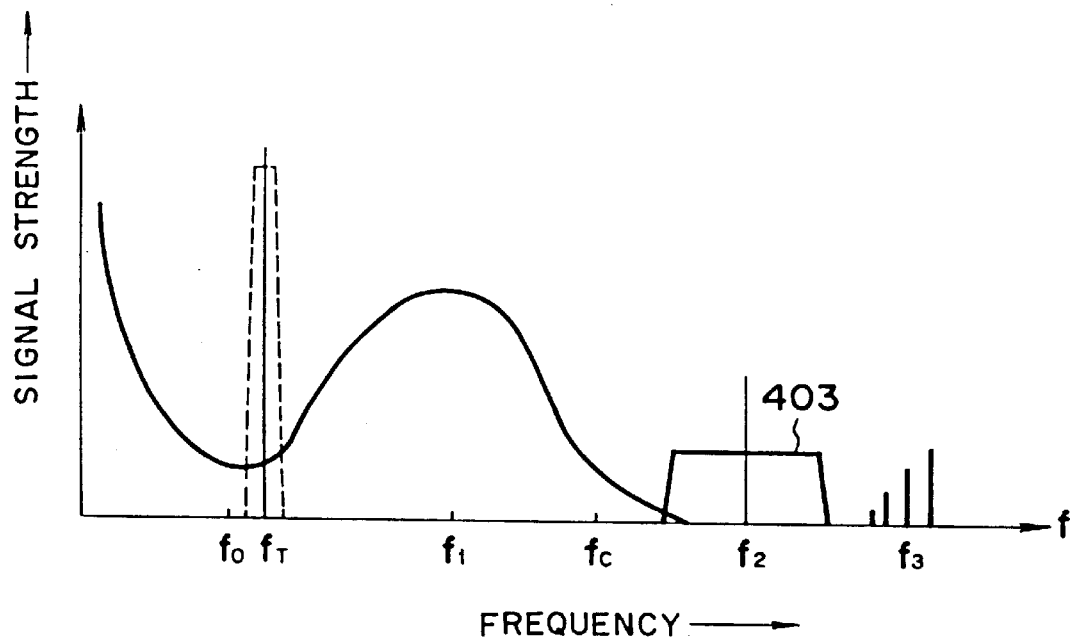

FIG. 2 shows the frequency spectrum of the signal at the ⓐ point when the recording medium according to the present invention is used for the information processing device in FIG. 7.

The signals of the frequency components of $f_o$ or lower are due to gentle undulation of the medium on account of warping, distortion, etc, of the substrate 101. $f_2$ is the conveying wave component of the recording data, and 403 shows the data signal band. $f_3$ is the signal component formed from the atomic, molecular arrangement in the recording layer 103.

The signal with $f_1$ as the center is slight unevenness on the surface of the matrix transferred onto the surface of the electrode layer 102, and such unevenness is prepared equal to or smaller than the recorded signal of the data. The change of the unevenness is 1 nm or less in the recording and reproducing for which STM is applied. In the recording medium according to the present invention, the size of the smooth surface of the recording layer 103 surface becomes 1 μm☐ more. From this fact, the following effects can be obtained.

(1) The signal component $f_1$ due to the unevenness on the surface of the recording layer 103 and the data signal band 403 will not overlap each other, and there is no lowering in SIN due to expansion of the spectrum of $f_1$. That is, the data error ratio can be made small.

(2) Due to absence of unevenness on the surface of the recording layer 103, the displacement of the Z-axis of the probe electrode 202 is small when performing XY scanning while constantly maintaining the gap between the surface of the recording layer 103 and the probe electrode 202. For this reason, the XY stage 201 can be driven at extremely high speed.

(3) Due to absence of unevenness on the surface of the recording layer 103, the position of the tip of the probe electrode 202, namely the tip atom where tunnel current flows can be stably selected. Also, there will be no so called ghost phenomenon, namely flow of tunnel current between a plurality of atoms of the probe electrode 202 and the recording layer 103, as seen on the recording layer 103 surface having unevenness.

The embedded electrode suitable as the lowest layer electrode of the lamination type device to which the process for preparing the smooth electrode substrate is applied, and the process for preparing the same as described below.

More specifically, there is provided an embedded electrode embedded in the substrate by backing a metal thin film formed on a substrate having smooth surface with a solid supporting substrate, peeling off the smooth substrate to have the smooth substrate surface transferred onto the metal thin film surface, thereby making a film having smoothness with a difference in height of unevenness of 1 nm or less, forming a metal thin film and an insulating thin film on the smooth surface substrate, and further backing a solid insulating supporting substrate.

By doing so, the electrode surface and the insulating supporting substrate surface can be formed on the same plane. In this case, no severe film thickness control is required, and the thin film formation method may be the vacuum vapor deposition method or the sputtering method conventionally employed.

The insulating layer for embedding the electrode should desirably be one which is poor in adhesion to the smooth substrate but good in adhesion to the electrode material. Its formation method may be the thin film formation technique well known in the art.

However, only if the adhesion to the insulating layer for embedding the electrode is good, by providing an appropriate peeling layer on the smooth substrate, peeling between the smooth substrate and the electrode or the insulating layer can be done easily. Therefore, when there is a peeling layer, there is no restriction of the electrode material and the insulating material as already described.

In backing with the solid supporting substrate, an appropriate adhesive layer may be conveniently provided, but depending on the material, stronger adhesive force can be obtained through eutectic bonding which bonds the material directly to the substrate. As the adhesive layer, one of the non-solvent types with no volume shrinkage is preferable. For example, insulating adhesives such as the epoxy resin type, α-cyanoacrylate type, etc., or electroconductive adhesives such as Epotech-silver series, etc. are preferred. In the case of direct bonding, no adhesives layer is required.

As the solid supporting substrate, when an adhesive layer is interposed, any material such as metal, glass, ceramics, plastic materials, etc. may be employed, but when a supporting substrate is directly bonded to the electrode, it is preferable to employ a relatively smooth material. Also, it is possible to provide a supporting substrate by forming a thick metal layer by electroforming.

In preparing the above-mentioned smooth electrode substrate, the electrode material has been limited to a material with mutually poor adhesion peelable after direct film formation on the matrix, whereby difficulties have been encountered particularly in transfer duplication of the same smooth surface as the matrix by repeating transfer. This has also made it difficult to prepare a matrix for molding working necessary for bulk production of recording medium requiring smooth flat surface, thereby making molding working difficult.

Accordingly, in the following, preparation of a smooth electrode substrate enabling free choice of the electrode material is to be described.

The specific feature of the present invention resides is a process for preparing a peeling film by forming a metal film on a smooth matrix surface and peeling off said metal film to obtain a metal film with smooth surface, or forming further a metal film on the above-mentioned metal film surface after peeling, peeling off said metal film to obtain a metal film with smooth surface, the peeling film formed on the surface of the matrix or the metal film being formed by use of Langmuir-Blodgett's method (hereinafter abbreviated as the LB method).

Such LB method is a method which forms a monomolecular film or its built-up film by utilizing the fact that in a molecule with a structure having a hydrophilic site and a hydrophobic site in molecule (amphiphilic molecule), when the balance between the two (amphiphilic balance) is adequately kept, the molecule becomes a layer of a single molecule with the hydrophilic group being directed downward on water surface.

According to the LB method, a monomolecular film of an organic compound having a hydrophobic site and a hydrophilic site in one molecule or its built-up film can be easily formed on a substrate, and a uniform, homogeneous ultra-thin film can be supplied stably over a large area. Its film thickness can be controlled with the length of the molecule as the unit. That is, the film thickness is increased by the thickness corresponding to one molecule length as the built-up number is increased by one layer.

Therefore, the film thickness of the peeling film formed by the LB method is controlled within 2 to 3 nm as the unit, whereby a film thickness uniformity with 1 nm or less can be easily obtained. For this reason, the smooth surface with a difference in height of 1 nm or less possessed by the matrix can be faithfully preserved, whereby the surface transferred can also retain difference in height of 1 nm or less, and otherwise it becomes possible to effect transfer duplication between the materials with good adhesion.

As the constituent molecule of the organic thin film according to the present invention, any molecule which can form a monomolecular film on water surface and build it up may provide a suitable substrate, including, for example, amphiphilic molecules such as straight chain fatty acids, etc. Otherwise, various polymeric compounds are suitable.

Figure 16:
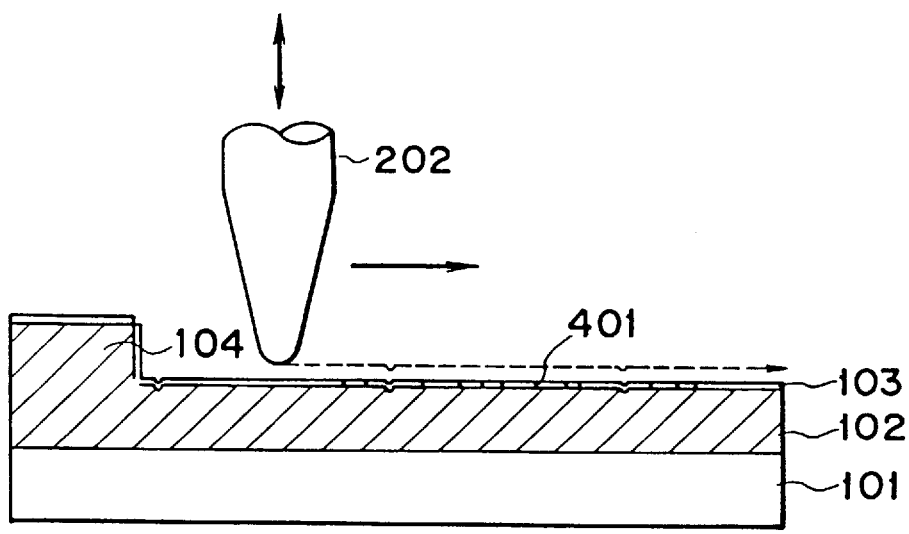
FIG. 16 is a schematic sectional view of the recording medium to be used for the present invention.

FIG. 16 shows a sectional view of the recording medium according to another embodiment of the present invention. 101 is a substrate, 102 an electrode layer having smooth surface, 103 a recording layer, and 104 a track.

FIGS. 18A–18G show sectional views in the respective steps of preparing the recording medium according to the present invention.

In FIG. 18A, first a smooth matrix 11 is prepared. The smooth matrix has a smooth surface with surface unevenness of 1 nm or less, over preferably 1 $\mu$m□ or more.

Next, as shown in FIG. 18B, the track 104 is formed on the smooth matrix 11. The track 104 is used for tracking for monitoring efficiently random access, positional determination, data series when performing recording and reproducing of the data, and formed by providing concave- or convex-shaped step difference. In the case of convex-shape, the track 104 may be formed by conventional photoetching of a thin film formed on the smooth matrix 11. Preferably, the track may be formed according to the lift-off method. More preferably, the track 104 pattern should be formed by selective deposition by maskless working. In the case of concave-shape, it is formed directly by working of the smooth matrix 11 according to conventional photoetching. Preferably, it should be formed by selective etching into the track 104 pattern by maskless working. Further, in either case, care should be taken so that the smooth surface other than the track 104 may not be roughened.

Next, as shown in FIG. 18C, the electrode layer 102 is formed on the smooth matrix 11 containing the track 104. As the electrode layer 102 according to the present invention, a material having high electroconductivity and not having good adhesiveness with the smooth substrate 11 may be preferably employed.

Next, as shown in FIG. 18D, the adhesive layer 13 is formed on the electrode layer 102. As the adhesive layer 13 according to the present invention, one of the non-solvent type free from volume shrinkage is preferable, as exemplified by insulating adhesives such as epoxy resin type, $\alpha$-cyanoacrylate type, etc., electroconductive adhesives such as Epotech silver series, etc.

Next, as shown in FIG. 18E, the substrate 101 is plastered on the adhesive layer 13. In this step, when the substrate 101 and the electrode layer 102 are directly bonded, for example, in the case of eutectic bonding, electroforming, the adhesive layer 13 can be omitted. As the substrate 101 according to the present invention, when the adhesive layer 13 is interposed, any material of metals, glasses, ceramics, plastic materials, etc. can be employed. When directly bonded to the substrate 101, a relatively smoother material is preferable. Further, when the electrode layer 102 is thick, the substrate 101 can be also omitted.

Next, as shown in FIG. 18F, by peeling off the smooth substrate 11 from the electrode layer 102, a smooth electrode substrate having 1 $\mu$m□ more of a smooth surface with unevenness of 1 nm or less can be formed.

Next, as shown in FIG. 18G, a recording medium is obtained by forming a recording layer 103 on the electrode layer 102 of the smooth electrode substrate.

Figure 17:
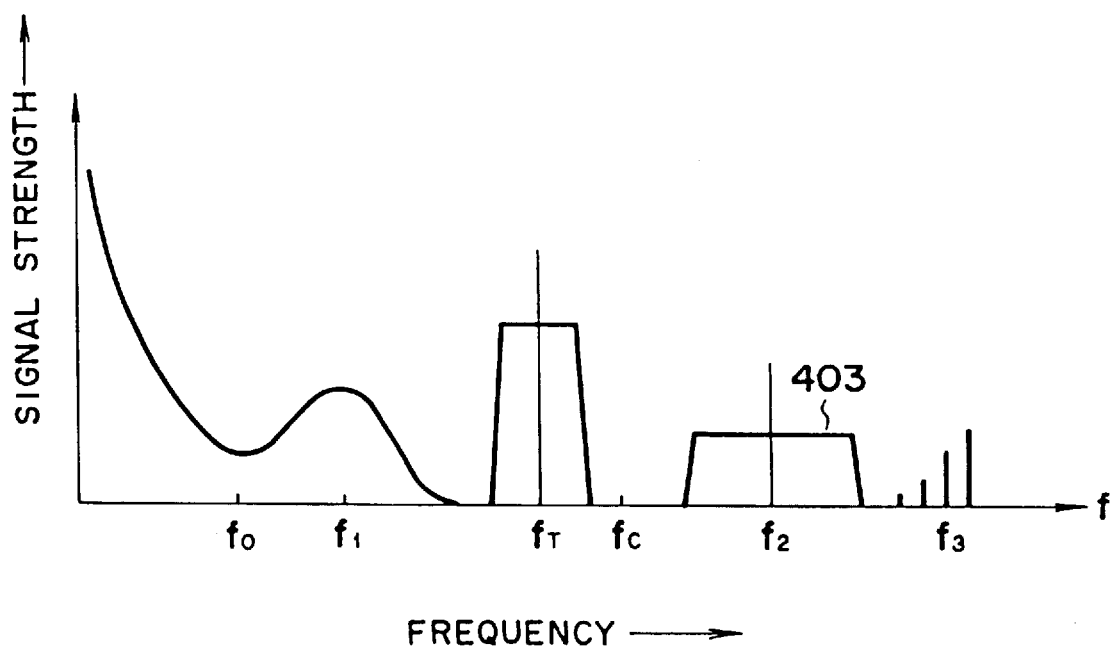
FIG. 17 is the frequence spectrum diagram of the reproduced signal.

FIG. 17 shows the frequency spectrum of the signal of the point ⓐ in FIG. 7 when the recording medium according to the present invention is used for the information processing device.

The signals of the frequency components of $f_o$ or less is due to gentle undulation of the medium on account of warping, distortion, etc. of the substrate 101. $f_2$ is the conveying wave component of the recording data, and 403 shows the data signal band. $f_3$ is the signal component generated from the atom, the molecular arrangement of the recording layer 103. $f_T$ is the tracking signal. The signal with $f_1$ as the center is the slight unevenness on the surface of the matrix transferred onto the surface of the electrode layer 102, which unevenness is prepared equal to or smaller than the recording signal of the data. The change in unevenness is 1 nm or less in recording and reproducing to which STM is applied. In the recording medium according to the present invention, the size of the smooth surface of the recording layer 103 surface becomes 1 $\mu$m□ more.

By this fact, the following effects are obtained:

(1) The signal component $f_1$ due to the unevenness on the recording layer 103 surface and the data signal band 403 will not overlap each other, and there is no lowering in S/N on account of expansion of the spectrum of $f_1$. Thus, the data error ratio can be made small.

(2) The tracking signal $f_T$ can be placed in the vicinity of the data signal band 403. For this reason, the frequency of tracking can be taken higher, whereby the monitoring precision of tracking can be sufficiently ensured.

(3) Because the frequency of tracking is high, when the step difference for such tracking is formed onto the recording medium, it may be of substantially the same size as the data bit size, and tracking can be performed without sacrificing the recording density.

(4) Due to absence of unevenness on the recording layer 103 surface, there is little displacement of the Z-axis of the probe electrode 202 when performing XY scanning while maintaining constantly the gap between the surface of the recording layer 103 and the probe electrode 202. For this reason, the XY stage 201 can be driven at an extremely high speed.

(5) Due to absence of unevenness on the recording layer 103 surface, the tip of the probe electrode 202, namely the position of the tip atom where the tunnel current flows can be stably selected. There will be no so called ghost phenomenon in which the tunnel current flows between a plurality of atoms of the probe electrode 202 and the recording layer 103 as seen on the recording layer 103 surface with unevenness.

Figure 22:
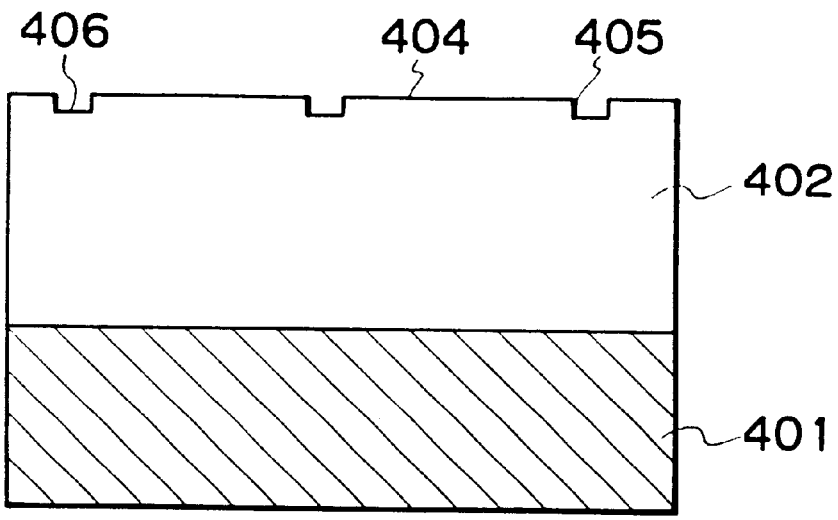
FIG. 22 and FIG. 23 show constitutional sectional views of the recording medium according to another embodiment of the present invention.

FIG. 22 shows the recording medium according to another embodiment of the present invention. 405 is a track, and 406 a groove for tracking. Tracking is performed making use of the track 405. 402 is a metal electrode and a recording layer, and 401 a substrate. 404 is the recording surface corresponding to the recording position.

Here, the track groove 406 which is the specific feature of the present invention may be as shallow as possible, and a preferable depth is the region where the tunnel current can be detected from the surface of the electroconductive material. It differs slightly depending on the work function of the electroconductive material, the bias voltage, etc., with its distance being about several nm at the maximum, but a preferable distance may be 20 Å or less from the standpoint of its current detection method, etc.

Figure 23:
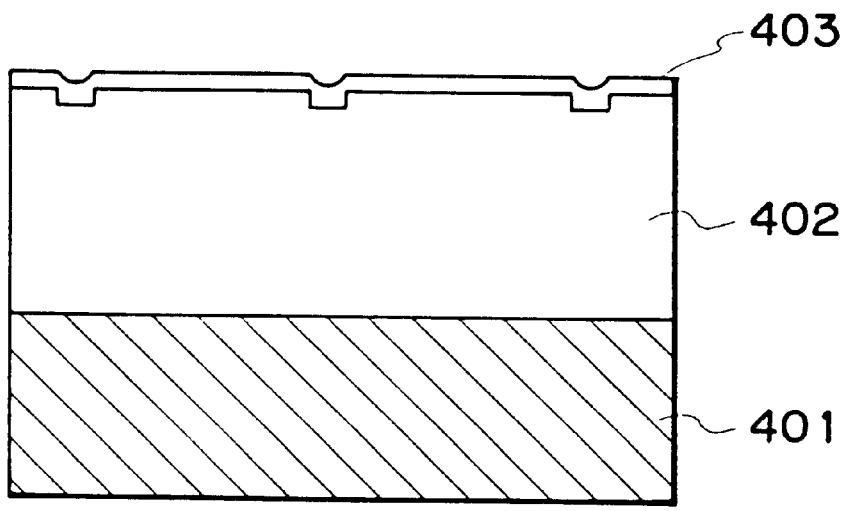

Next, another recording medium according to the present invention is shown in FIG. 23. In the present invention, as compared with the recording medium shown in FIG. 22 as described above, the metal electrode 402' was made separate from the recording layer 403. The characteristic point of such constitution is that the recording layer 403 is not limited to electroconductive materials, but a laminar organic thin film, etc. can be used. In this case, depending on the thickness of the thin film, a tunnel current can be obtained between both electrodes, provided that the thin film has a thickness within the range from 4 Å to 20 Å (when the application voltage is 0.1 to 10 V).

Next, the process for preparing the recording medium according to the present invention is shown in FIGS. 24A to 24G. First, as shown in FIG. 24B, on a smooth matrix 407 with extremely good matrix 407 such as molten quartz, mica substrate, etc., and amphiphilic organic material having sensitivity to energy rays such as electron beam, etc. is formed into a thin film 408 according to the Langmuir-Blodgett's method (LB method). The film formed by the LB method is called LB film. Next, as shown in FIG. 24C, patterning is formed by irradiation of an energy ray into a pattern, followed by developing, etc. Next, as shown in FIG. 24D, a metal electrode layer 402 is formed on the substrate subjected to patterning according to conventional vacuum vapor deposition method, sputtering method, epitaxial growth method. Next, as shown in FIG. 24E, on the substrate where peeling is effected (the substrate 401 for forming electrodes) is coated an adhesive such as polyimide type adhesive, epoxy type adhesive, cyanoacrylate type adhesive, etc., followed by adhesion to the electrode surface. Next, as shown in FIG. 24F, this is peeled off to peel off the metal electrode from the smooth surface, whereby an electrode substrate (recording medium) can be obtained.

Next, as shown in FIG. 24G, the recording layer is formed by use of the electrode substrate.

On the other hand, the electrode having smooth surface can be prepared by peeling off the electrode vapor deposited on a smooth matrix during this procedure and transferring it onto another substrate. The electrode surface reflects the surface of the smooth surface, and the surface of the electrode substrate obtained can also be equal to the substrate surface.

According to the preparation process as described above, a track with shallower depth as compared with the prior art can be formed on the electrode layer, whereby it becomes finally possible to detect the tunnel current from the groove bottom.

EXAMPLE 1

Example 1 of the present invention is described by referring to FIGS. 3A–3F.

First, as shown in FIG. 3A, a mica plate was cleaved in the air to form a smooth substrate 11. Subsequently, as shown in FIG. 3B, a film of gold was formed by the vacuum vapor deposition method on the smooth substrate 11 to form an electrode layer 102. Said electrode layer 102 was formed by maintaining the substrate temperature at room temperature under the conditions of a vapor deposition speed of 10 Å/sec, a reaching pressure of $2 \times 10^{-6}$ Torr, a film thickness of 2000 Å. Subsequently, as shown in FIG. 3C, an adhesive layer 12 (Hitemp HT-10, manufactured by Konishi) was coated on the electrode layer 102. Subsequently, as shown in FIG. 3D, a substrate 101 was plastered onto the adhesive layer 12. Adhesion of said substrate 101 was effected under the conditions of a pressurizing force of 5 kg/cm$^2$, a temperature of 200° C. and a curing time of one hour. Subsequently, as shown in FIG. 3E, the smooth substrate 11 was peeled off from the electrode layer 102 to obtain a smooth electrode substrate comprising the substrate 101, the adhesive layer 12 and the electrode layer 102. When the surface of the smooth electrode substrate was observed by STM, the surface unevenness was found to be 1 nm or less at 10 μm□.

Next, as shown in FIG. 3F, a polyimide LB film of 4 layers was formed on the smooth electrode substrate to provide a recording layer 103. In the following, the method for forming the recording layer 103 by use of the polyimide LB film is described.

The polyamide acid represented by the formula (1) was dissolved in an N,N$^1$-dimethylacetamide-benzene solvent mixture (1:1 V/V) (concentration calculated on monomer $1 \times 10^{-3}$ M), and then a $1 \times 10^{-3}$ M solution of N,N-dimethyloctadecylamine in the same solvent separately prepared mixed at 1:2 (v/v) to prepare a polyamide acid octadecylamine salt solution represented by the formula (2).

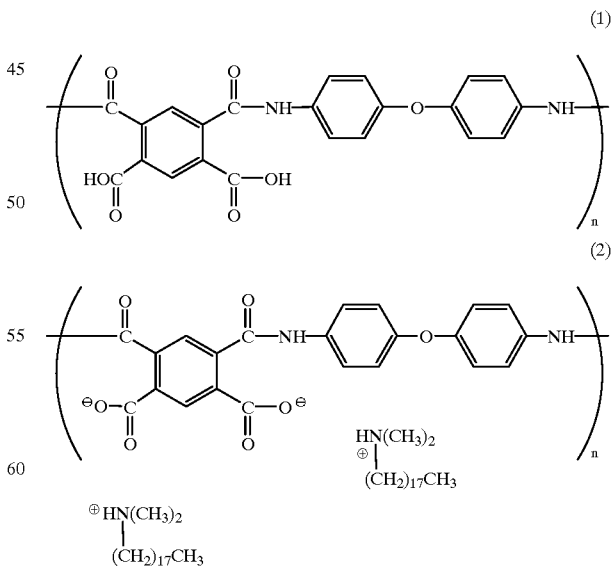

Such solution was spread on an aqueous phase comprising pure water at a temperature of 20° C. to form a monomolecular film on the water surface. After evaporation of the solvent, the surface pressure was enhanced to 25 nN/m. The above described smooth electrode substrate was dipped gently in the direction transversing the water surface at a speed of 5 mm/min. while constantly maintaining the surface pressure, and then drawn up gently at 5 mm/min. to form a Y-type monomolecular built-up film of 2 layers. By repeating such operations, a monomolecular built-up film of the polyamide acid octadecylamine salt of 4 layers was obtained. Next, the substrate was heated under reduced pressure (ca. 1 mm Hg) at 300° C. for 10 minutes to imidate the polyamide acid octadecylamine salt (the formula 3), to obtain a polyimide monomolecular built-up film of 4 layers.

Figure 10:
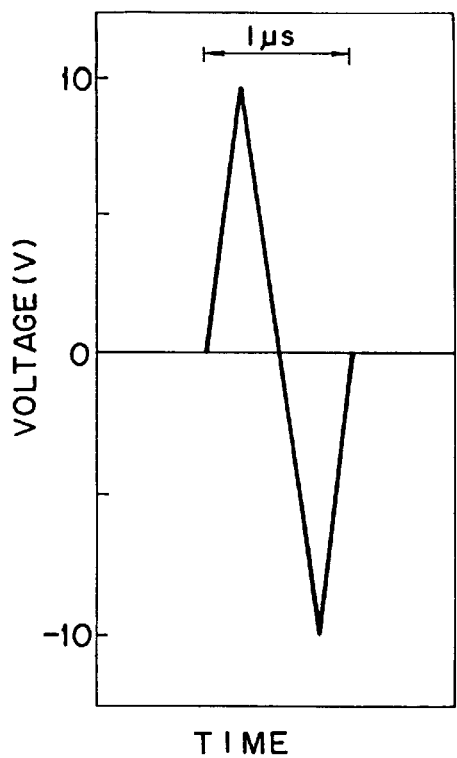
FIG. 10 is a wave form chart of the pulse voltage in performing recording on the recording medium of the present invention.

Next, while scanning the probe electrode 202 over the recording layer 103, recording was performed at 100 Å pitch. Recording of such pitch was performed with the probe electrode 202 on the + side and the electrode layer 102 on the − side, and a rectangular pulse voltage (the first pulse voltage) exceeding the threshold value voltage $V_{th}ON$ shown in FIG. 10 at which the electrical memory material (4 layers of polyimide LB film) changes to low resistance state (ON state) was applied. Then, the probe electrode 202 was returned to the recording initiation point, and again scanned over the recording layer 103. At this time, Z was controlled to be substantially constant during reading of recording. As the result, in the data bit 401 in FIG. 1, a probe current of about 10 nA flowed, thereby indicating the ON state.

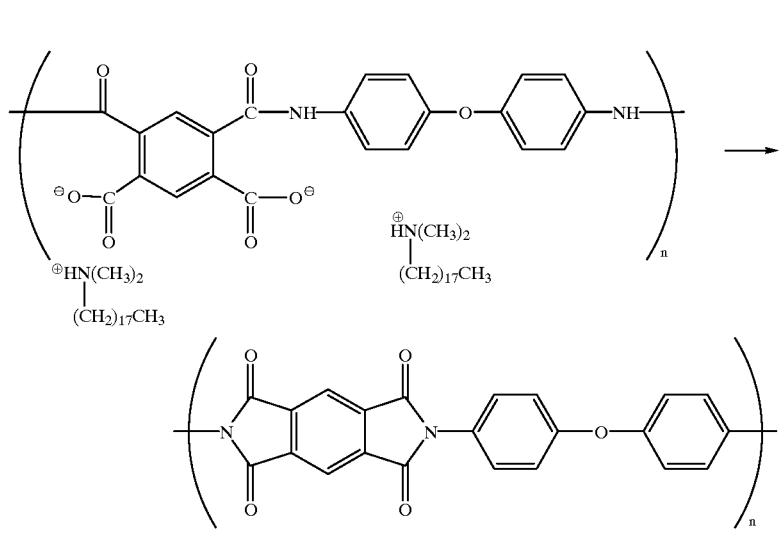

(3)

Next, by use of the recording medium prepared by the method as described above, the surface shape was examined by the information processing device shown in FIG. 7. As the result, the recording medium surface was found to reflect the smooth surface of the electrode, and the surface unevenness was 1 nm or less at 10 μm□. Next, the experiments of, recording, reproducing and erasing were practiced.

As the probe electrode 202, a probe electrode 202 made of platinum/rhodium was employed. The probe electrode 202 is provided for controlling the distance (Z) from the surface of the recording layer 103 and finely controlled in its distance (Z) by a piezoelectric element so as to constantly maintain the current. Further, linear actuators 204, 205, 206 are designed so that they can also be finely controlled in the interplanar (X, Y) direction while maintaining constantly the distance Z.

The probe electrode 202 can perform directly recording, reproducing and erasing. The recording medium is placed on the XY stage 201 of high precision, and can be moved to any desired position.

The recording medium having the recording layer 103 with 4 polyimide layers built up was placed on the XY stage 201. Next, a voltage of +1.5 V was applied between the probe electrode 202 and the electrode layer 102 of the recording medium to control the distance (Z) between the probe electrode 202 and the surface of the recording layer 103 while monitoring the current. At this time, the probe current Ip for controlling the distance Z between the probe electrode 202 and the surface of the recording layer 103 was controlled so as to become $10^{-10} A \geq Ip \geq 10^{-11} A$.

The probe voltage was set at 10 V exceeding the threshold value voltage $V_{th}OFF$ at which the electrical memory material changed from the ON state to the OFF state (the second pulse voltage), and again the recording position was traced. As the result, it was confirmed that all the recorded states had been erased to be transitioned to the OFF state. Further, when the error ratio of the reading data was examined by making the reading speed constant, it was rendered possible to be made as markedly small as $10^{-7}$, while it was $10^{-4}$ in the prior art example.

EXAMPLE 2

Figure 4A:
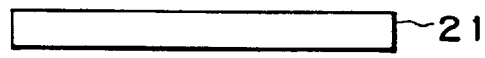
Figure 4B:
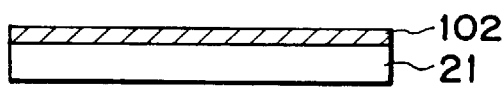
Figure 4C:
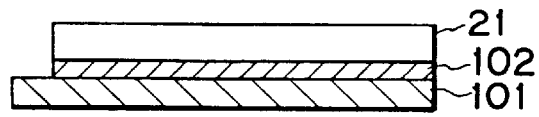
Figure 4D:
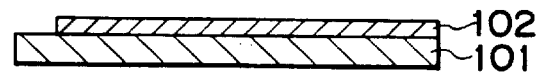

Example 2 of the present invention is described by referring to FIGS. 4A–4E. First, as shown in FIG. 4A, a mica plate is cleaved in the air to form a smooth substrate 21. Subsequently, as shown in FIG. 4B, a film of gold is formed on the smooth substrate 21 by the vacuum vapor deposition method to form an electrode layer 102. Said electrode layer 102 was formed while maintaining the substrate temperature at room temperature, under the conditions of a vapor deposition speed of 10 Å/sec, a reaching pressure of $2 \times 10^{-6}$ Torr, a film thickness of 5000 Å. Subsequently, as shown in FIG. 4C, a Si wafer as the substrate 101 was heated by a heater to be maintained at a constant temperature, and subsequently the electrode layer 102 and the substrate 101 were eutectic bonded by rubbing slightly the surface of the electrode layer 102 formed on the smooth substrate 21 against the substrate 101. Said bonding was effected by maintaining the substrate temperature at 400° C. under the conditions of a pressurizing force of 2 kg/cm² for 1 minute. Subsequently, as shown in FIG. 4D, the smooth substrate 21 was peeled off from the electrode layer 102 to obtain a smooth electrode substrate comprising the substrate 101 and the electrode layer 102.

When the surface of the smooth electrode substrate thus obtained was observed by STM, the surface unevenness was found to be 1 nm or less at 10 μm☐.

Figure 4E:
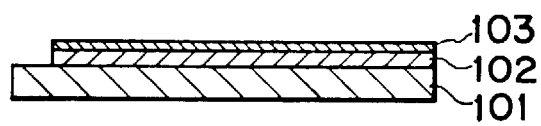

Next, as shown in FIG. 4E, a polyimide LB film of 4 layers was formed on the smooth electrode substrate to provide a recording layer 103.

Next, by use of the recording medium prepared by the method as described above, the surface shape was examined by the information processing device shown in FIG. 7. As the result, the recording medium surface found to reflect the smooth surface of the electrode, and the surface unevenness was 1 nm or less at 10 μm☐. Next, experiments of recording, reproducing and erasing were conducted, whereby it was confirmed that recording, reproducing and erasing could be performed similarly as in Example 1.

EXAMPLE 3

Figure 5A:
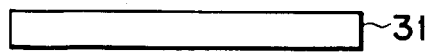
Figure 5B:
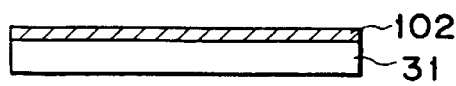
Figure 5C:
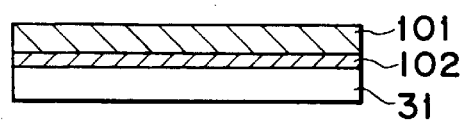
Figure 5D:
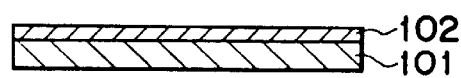

Example 3 of the present invention is described by referring to FIGS. 5A–5E. First, as shown in FIG. 5A, a mica plate is cleaved in the air to form a smooth substrate 31. Subsequently, as shown in FIG. 5B, a film of Au—Pd is formed on the smooth substrate 31 by the vacuum vapor deposition method to form an electrode layer 102. Said electrode layer 102 was formed while maintaining the substrate temperature at room temperature, under the conditions of a vapor deposition speed of 10 Å/sec, a reaching pressure of $2 \times 10^{-6}$ Torr, a film thickness of 1000 Å. Subsequently, as shown in FIG. 5C, nickel was formed by electroforming on the electrode layer 102 to provide a substrate 101. Said electroforming was conducted by use of a Watt bath by maintaining the temperature at 50° C. under the conditions of a current density of 0.06 A/cm² and an electroforming time of 2 hours to obtain a thickness of 100 μm. Subsequently, as shown in FIG. 5D, the smooth substrate 31 was peeled off from the electrode layer 102 to obtain a smooth electrode substrate comprising the substrate 101 and the electrode layer 102.

When the surface of the smooth electrode substrate thus obtained was observed by STM, the surface unevenness was found to be 1 nm or less at 10 μm☐.

Figure 5E:
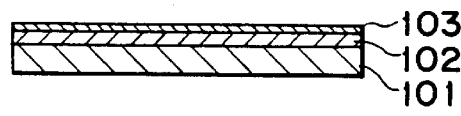

Next, as shown in FIG. 5E, a polyimide LB film of 4 layers was formed on the smooth electrode substrate to provide a recording layer 103.

Next, by use of the recording medium prepared by the method as described above, the surface shape was examined by the information processing device shown in FIG. 7. As the result, the recording medium surface was found to reflect the smooth surface of the electrode, and the surface unevenness was 1 nm or less at 10 μm☐. Next, experiments of recording, reproducing and erasing were conducted, whereby it was confirmed that recording, reproducing and erasing could be performed similarly as in Example 1.

EXAMPLE 4

Figure 6A:
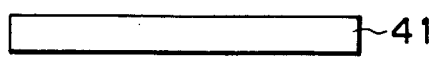
Figure 6B:
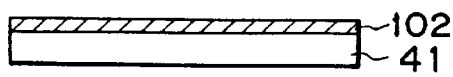
Figure 6C:
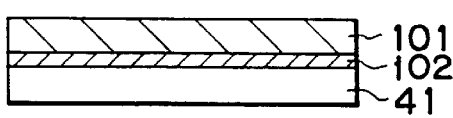
Figure 6D:

Example 4 of the present invention is described by referring to FIGS. 6A–6E. First, as shown in FIG. 6A, a washed molten quartz is made a substrate 41. Subsequently, as shown in FIG. 6B, a film of gold is formed on the substrate 41 by the vacuum vapor deposition method to form an electrode layer 102. Said electrode layer 102 was formed while maintaining the substrate temperature at room temperature, under the conditions of a vapor deposition speed of 10 Å/sec, a reaching pressure of $2 \times 10^{-6}$ Torr, a film thickness of 5000 Å, a subbing layer Cr of 50 Å. Subsequently, as shown in FIG. 6C, with a mica plate cleaved in the air as the smooth substrate 101, it was placed on the electrode layer 102 and pressed. Said pressing was carried out in nitrogen atmosphere under the conditions of a pressurizing force of 10 kg/cm², a temperature of 500° C. and 1 hour. Subsequently, as shown in FIG. 6D, the smooth substrate 41 was peeled off from the electrode layer 102 to obtain a smooth electrode substrate comprising the substrate 101 and the electrode layer 102.

When the surface of the smooth electrode substrate thus obtained was observed by STM, the surface unevenness was found to be 1 nm or less at 10 μm☐.

Figure 6E:
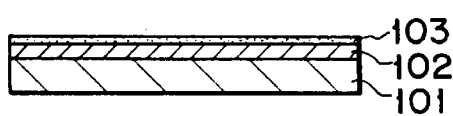

Next, as shown in FIG. 6E, a polyimide LB film of 4 layers was formed on the smooth electrode substrate to provide a recording layer 103.

Next, by use of the recording medium prepared by the method as described above, the surface shape was examined by the information processing device shown in FIG. 7. As the result, the recording medium surface found to reflect the smooth surface of the electrode, and the surface unevenness was 1 nm or less at 10 μm☐. Next, experiments of recording reproducing and erasing were conducted, whereby it was confirmed that recording, reproducing and erasing could be performed similarly as in Example 1.

EXAMPLE 5

A recording medium was formed in entirely the same manner as in Example 1 except for changing vapor deposition of gold to Pd, and the recording layer 103 to a 4-layer LB film of squarylium-bis-6-octylazulene (hereinafter abbreviated as SOAZ) from polyimide. In the following, the method for forming the recording layer 103 by use of SOAZ is described.

First, a benzene solution of SOAZ dissolved at a concentration of 0.2 mg/ml was spread on an aqueous phase of 20° C. to form a monomolecular film on the surface. After evaporation of the solvent, the surface pressure of such molecular film was enhanced to 20 mN/m, and while maintaining constantly the pressure, the above smooth electrode substrate was dipped and drawn up gently at a speed of 3 mm/min. in the direction transversing the water surface to form a built-up film of 2 layers of SOAZ monomolecular film.

Next, by use of the recording medium prepared by the method as described above, the surface shape was examined by the information processing device shown in FIG. 7. As the result, the recording medium surface was found to reflect the smooth surface of the electrode, and the surface unevenness was 1 nm or less at 10 μm☐. Next, experiments of recording, reproducing and erasing were conducted, whereby it was confirmed that recording, reproducing and erasing could be performed similarly as in Example 1.

EXAMPLE 6

The present invention is described by referring to FIGS. 12A–12D.

On the smooth surface of a smooth matrix 11 having smoothness of 0.5 nm or less obtained by cleaving mica in the air, one layer of a monomolecular film of cadmium arachidinate ($CH_3(CH_2)_{18}COO^-$ $Cd^{2+}$) was rapidly formed according to the LB method to provide a peeling layer 512. In the following, details of the method for forming the peeling layer 512 according to the LB method are described.

Figure 12A:
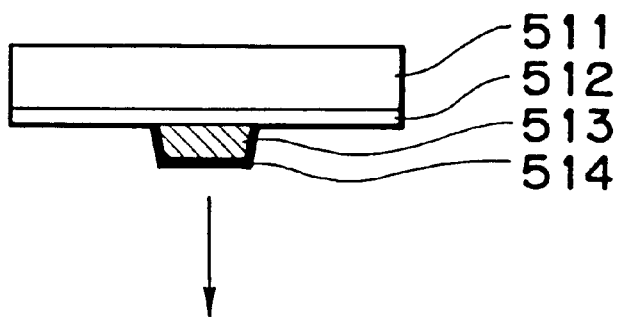
FIGS. 12A to 12D and FIGS. 13A to 13F show the steps for forming the embedded electrode of the present invention.
Figure 12B:
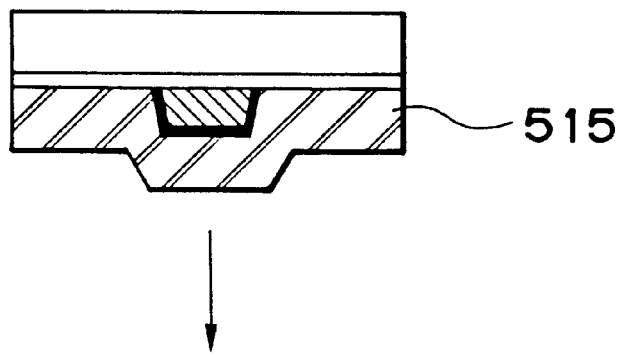
Figure 12C:
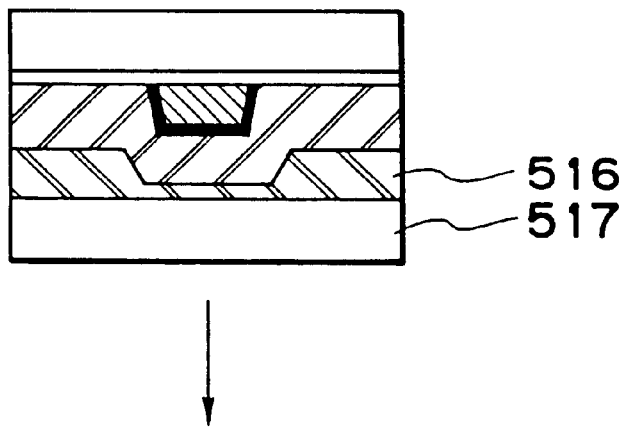
Figure 12D:
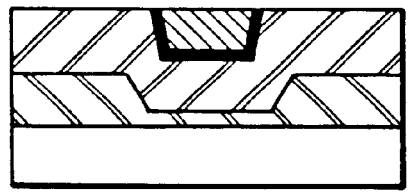
Figure 13A:
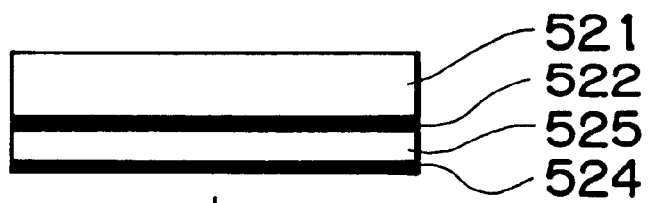
Figure 13B:
Figure 13C:
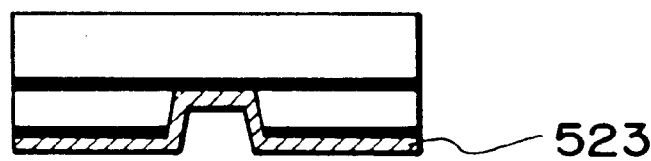
Figure 13D:
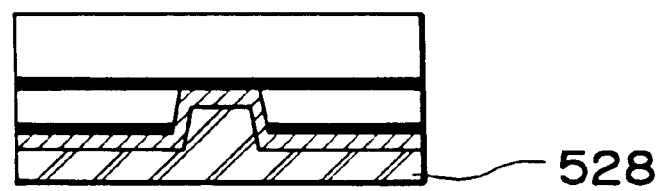
Figure 13E:
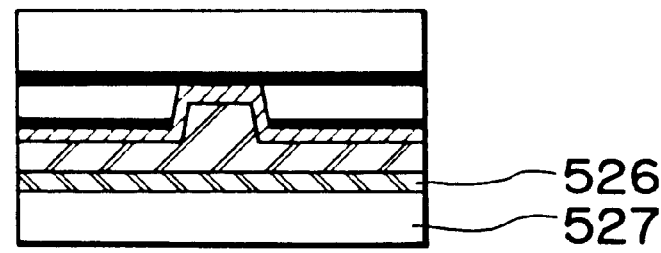
Figure 13F:
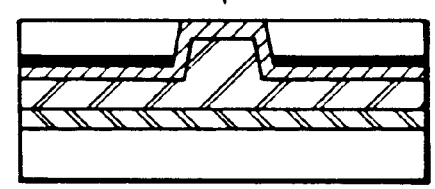

A chloroform solution containing arachidinic acid ($CH_3(CH_2)_{18}COO^H$) dissolved at a concentration of 0.5 mg/ml therein was spread on an aqueous phase of a water temperature of 20° C. with a $CdCl_2$ concentration of $4\times10^{-4}$ mol/liter adjusted to Ph 6.4 with $KHCO_3$ to form a monomolecular film on the water surface. After evaporation of the solvent, the surface pressure of such monomolecular film was enhanced to 30 mN/m, and while maintaining this pressure constantly, the above-mentioned smooth matrix 511 previously sunk into the aqueous phase was gently drawn up at a speed of 3 mm/sec to have a monomolecular film of cadmium arachidinate transferred onto said smooth matrix 511. Next, on the peeling layer 512 was formed a stripe-shaped gold thin film with a width of 1 mm as shown in FIG. 12A, and a chromium thin film 514 was formed according to the vacuum vapor deposition method. Such gold electrode 513 and chromium thin film 514 were formed through a mask corresponding to FIG. 12A while maintaining the substrate temperature at room temperature under the conditions of a vapor deposition speed of 10 Å/sec and a reaching pressure of $2\times10^{-6}$ Torr. The gold electrode 513 had a film thickness of 3000 Å and the chromium thin film 514 a film thickness of 100 Å. Subsequently, an $SiO_2$ film 515 was formed with a film thickness of 5000 Å on the whole surface according to the vacuum vapor deposition method (FIG. 12B). Next, on the $SiO_2$ film 515 was coated an adhesive layer 516 (epoxy resin type Hisuper 5, manufactured by Cemedine), and subsequently the substrate 517 was plastered onto the adhesive layer 517 (FIG. 12C). Adhesion of such substrate 517 was effected under the conditions of a pressure of 5 kg/cm², a temperature of 23° C. and a curing time of 24 hours. Finally, the smooth matrix 511 was peeled off to obtain an embedded electrode substrate with the exposed surface of the gold electrode 513 having smoothness with the surface of the smooth matrix transferred and being exposed in the $SiO_2$ film 515, and also the surface of the $SiO_2$ film 515 and the exposed surface of the gold electrode 513 existing on the same plane (FIG. 12D).

When the surface of the gold electrode 513 was observed by a STM, the surface unevenness within the range of 10 $\mu m\square$ was 1 nm or less. Also, no abnormal surface shape which was regarded as the residue of the peeling layer 512 was observed. Further, the scanning electronic microscope observation was conducted under low acceleration voltage, whereby no stepped difference between the electrode 513 and the $SiO_2$ film 515 was seen.

EXAMPLE 7

This Example is described by referring to FIG. 13. On the smooth surface of a smooth matrix 521 obtained by cleaving mica in the air was formed one layer of monomolecular film of cadmium arachidinate according to the LB method to provide a peeling layer 522. Next, an $SiO_2$ film 525 (film thickness 2000 Å) was formed by the vacuum vapor deposition method, and subsequently a chromium thin film 524 (film thickness 300 Å) was formed by the vacuum vapor deposition method (FIG. 13A). Next, a resist was coated and subjected to exposure and developing to form a pattern of 1 mm-20 mm diameter, and the chromium thin film 524 and the $SiO_2$ film 525 were successively etched, followed by removal of the resist to form a pattern as shown in FIG. 13B. On such substrate was formed a gold thin film 523 (film thickness 3000 Å) by the vacuum vapor deposition method (FIG. 13C). On the metal thin film 523 was formed nickel by electroforming to obtain a nickel electrode 528. Said electroforming was carried out by use of a Watt bath while maintaining the temperature at 50° C. under the conditions of a current density of 0.06 A/cm², as an electroforming time of 2 hours, to obtain a film thickness of 100 $\mu m$ (FIG. 13D). Further, an adhesive layer 526 was coated on the nickel electrode 528, and a substrate 527 was plastered thereon (FIG. 13E). Finally, the smooth matrix 521 was peeled off to obtain an embedded electrode substrate having smoothness with the exposed surface of the gold thin film 523 of 1 mm to 20 mm diameter having transferred the surface of the smooth matrix, being embedded in the $SiO_2$ film 525, and with the surface of the $SiO_2$ film 525 and the exposed surface of the gold thin film 523 being on the same plane (FIG. 13F).

When the surface of the metal electrode 523 was observed by a STM, the surface unevenness within the range of 10 $\mu m\square$ was found to be 1 nm or less. Also, no rough surface which was regarded as the residue of the peeling layer 522 was observed. Further, scanning electron microscope observation was performed under low acceleration voltage, whereby no stepped difference between the electrode 523 and the $SiO_2$ film 525 was observed.

EXAMPLE 8

FIGS. 14A to 14D show an example of the transfer duplication step according to the present invention. As the matrix having a smooth surface, the cleaved surface of mica was employed. On the smooth surface of a smooth matrix 611 obtained by cleaving mica in the air, one layer of a monomolecular film of cadmium arachidinate ($CH_3(CH_2)_{18}COO^-$ $Cd^{2+}$) was formed according to the LB method to provide a peeling layer 612 (FIG. 14A). In the following, details of the method for forming the peeling layer 612 according to the LB method are described. A chloroform solution containing arachidinic acid ($CH_3(CH_2)_{18}COOH$) dissolved at a concentration of 0.5 mg/ml therein was spread on an aqueous phase of a water temperature of 20° C. with a $CdCl_2$ concentration of $4\times10^{-4}$ mol/1 adjusted to Ph 6.4 with $KHCO_3$ to form a monomolecular film on the water surface. After evaporation of the solvent, the surface pressure of such monomolecular film was enhanced to 30 mN/m, and while maintaining this pressure constantly, the above-mentioned smooth matrix 611 previously sunk into the aqueous phase was gently drawn up at a speed of 3 mm/sec to have a monomolecular film of cadmium arachidinate transferred onto said smooth matrix 611. Subsequently, as shown in FIG. 14B, a gold thin film 613 was formed according to the vacuum vapor deposition method. Such gold thin film 613 was formed while maintaining the substrate temperature at room temperature under the conditions of a vapor deposition speed of 10 Å/sec and a reaching pressure of $2\times10^{-6}$ Torr, to obtain a film thickness of 2000 Å. On the gold thin film 613 thus obtained was formed nickel by electroforming to provide a substrate 614 (FIG. 14C). Said electroforming was carried out while maintaining the temperature at 50° C. under the conditions of current density of 0.06 A/cm², an electroforming time of 2 hours to obtain a film thickness of 100 $\mu m$. Finally, as shown in FIG. 14D, the smooth matrix 611 and the metal thin film 613 were peeled off to obtain a replica comprising the metal thin film 613 and the nickel substrate 614 with the surface of the matrix 611 being transferred onto the surface of the gold thin film 613.

When the gold surface of the replica obtained was observed by STM, the surface unevenness within the range of 10 $\mu m\square$ was 1 nm or less. Also, no rough surface which was regarded as the residue of the peeling layer 612 was observed.

EXAMPLE 9

Figure 15A:
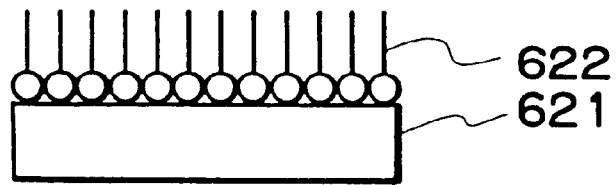
Figure 15B:
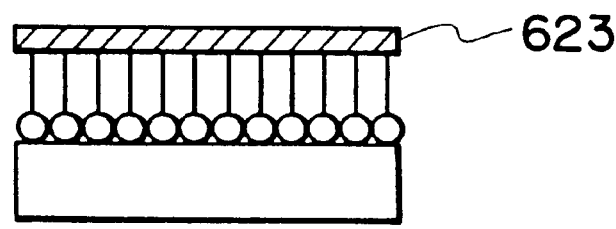
Figure 15C:
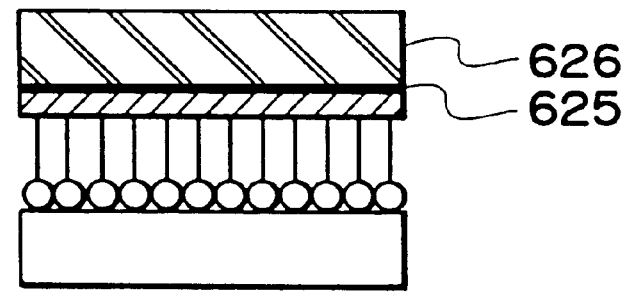
Figure 15D:

According to the same steps as in Example 8 immediately before electroforming of nickel, a peeling film 622 was formed on the smooth matrix 621 as shown in FIG. 15B to further obtain a gold thin film 623 with a film thickness of 2000 Å. Next, an adhesive layer 625 (epoxy resin type Hisuper 5, manufactured by Cemedine) was coated on the gold thin film, and subsequently the substrate was plastered on the adhesive layer 625. Adhesion of said substrate 626 was carried out under the conditions of a pressure of 5 kg/cm², a temperature of 23° C. and a curing time of 24 hours. Finally, the smooth matrix was peeled off to obtain a replica comprising the gold thin film 623, the adhesive layer 625 and the substrate 626 with the surface of the matrix 621 being transferred onto the surface of the gold thin film 623.

When the gold surface of the replica obtained was observed by STM surface unevenness within the range of 10 $\mu m\square$ was 1 nm or less. Also, no rough surface which was regarded as the residue of the peeling layer was observed.

EXAMPLE 10

After an electroformed nickel substrate was formed according to the same steps as in Example 8, an adhesive layer was coated in the same manner as in Example 9, and subsequently the substrate was plastered, followed finally by peel-off from the matrix, to obtain a replica comprising the gold thin film, the nickel substrate, the adhesive layer and the substrate with the surface of the matrix being transferred onto the gold thin film.

EXAMPLE 11

A replica was prepared in the same manner as in Example 8 except for using a polyisobutyl methacrylate monomolecular film in place of the cadmium arachidinate monomolecular film as the peeling film. During spreading of the polyisobutyl methacrylate monomolecular film, pure water was employed for the aqueous phase.

The replica obtained had surface unevenness of 1 nm or less within the range of 10 $\mu m\square$ similarly as when the cadmium arachidinate monomolecular film was employed, and no rough surface which was regarded as the residue of the peeled film was seen by STM observation.

EXAMPLE 12

According to entirely the same steps as in Example 1 except for using a tungsten carbide thin film in place of the gold thin film 613 in Example 8, a replica with the surface of the matrix being transferred onto the tungsten carbide thin film surface was obtained. The tungsten carbide film was formed at a substrate temperature of 200° C., an effective power of 500 W under a sputtering pressure of 5×10⁻³ Torr, to obtain a film thickness of 5000 Å.

As the result of observation by STM, the unevenness of the surface was found to be 1 nm or less over 10 $\mu m\square$. Further, no rough surface which was regarded as the residue of the peeled film was seen by STM observation.

EXAMPLE 13

Example 13 of the present invention is described by referring to FIGS. 18A to 18G.

First, as shown in FIG. 18A, a mica plate is cleaved in the air to form a smooth substrate 11.

Next, as shown in FIG. 18B, a track 104 of 0.1 $\mu$m in width, 0.1 $\mu$m in pitch and 50 Å in depth by a converging ion beam on the smooth substrate 11. The converging ion beam was irradiated under the conditions of an acceleration voltage of 40 KV, an ion current of 14 pA, a dose of 1.0×10¹⁶/cm², Au ion.

Next, as shown in FIG. 18C, a film of gold was formed on the smooth substrate 11 to form an electrode layer 102. The electrode layer 102 was formed by maintaining the substrate temperature at room temperature under the conditions of vapor deposition speed of 10 Å/sec, a reaching pressure of 2×10⁻⁶/Torr and a film thickness of 2000 Å.

Next, as shown in FIG. 18D, an adhesive layer 13 (Hitemp HT-10, manufactured by Konishi) was coated on the electrode layer 102.

Next, as shown in FIG. 18E, the substrate 101 was plastered on the adhesive layer 13. The substrate 101 was adhered under the conditions of a pressurizing force of 5 kg/cm², a temperature of 200° C. and a curing time of 1 hour.

Next, as shown in FIG. 18F, the smooth substrate 11 was peeled off from the electrode layer 102 to obtain a smooth electrode substrate comprising the substrate 101, the adhesive layer 13, the electrode layer 102, the track 104. When the surface of the smooth electrode substrate thus obtained was observed by STM, the surface unevenness except for the track 104 was 1 nm or less in Next, as shown in FIG. 18G, on the smooth electrode substrate was formed a polyimide LB film of 4 layers on the smooth electrode substrate to provide a recording layer 103. The formation of the recording layer 103, wherein the polyimide LB film is used, is performed as described in Example 1.

Next, by use of the recording medium prepared by the method as described above, the surface shape was examined by the information processing device shown in FIG. 7. As the result, the recording medium surface was found to reflect the smooth surface of the electrode and the track 104, the track 104 was formed to a height of 50 Å, and the surface unevenness except on the track 104 was 1 nm or less at 10 $\mu m\square$. Therefore, the track 104 can be clearly distinguished.

Next, the experiments of recording and reproducing were practiced. As the probe electrode 202, a probe electrode 202 made of platinum/rhodium was employed. The probe electrode 202 is provided for controlling the distance (Z) from the surface of the recording layer 103, and finely controlled in its distance (Z) by piezoelectric element so as to constantly maintain the current. Further, linear actuators 204, 205, 206 were designed so that they can also be finely controlled in the interplanar (X, Y) direction while constantly maintaining the distance Z.

The probe electrode 202 can directly perform recording, reproducing and erasing. The recording medium is placed on the XY stage 201 of high precision, and can be moved to any desired position.

The recording medium having the recording layer 103 with 4 polyimide layers built up was placed on the XY stage 202. Next, a voltage of +1.5 V was applied between the probe electrode 202 and the electrode layer 102 of the recording medium to control the distance (Z) between the probe electrode 202 and the surface of the recording layer 103 while monitoring the current. At this time, the probe current Ip for controlling the distance Z between the probe electrode 202 and the surface of the recording layer 103 was controlled so as to become $10^{-10} A \geq Ip \geq 10^{-11}$.

Next, while scanning the probe electrode 202, the track 10 was detected. The track 104 is provided for performing positional determination during recording and reproducing and monitoring the data series. At this time, when the probe electrode 202 approaches to the track 104, if the track 104 has a convex-shape, the fact that the tunnel current is abruptly increased between the probe electrode 202 and the track 104 is utilized, and if the track 104 has a concave-shape, the fact that the tunnel current is abruptly lowered is utilized. By recording and reproducing two-dimensionally the recorded information along the track 104, high speed access is effected. Next, recording was performed at 100 Å pitch. Recording of such pitch was performed with the probe electrode 202 on the + side and the electrode layer 102 on the − side, and a rectangular pulse voltage (the first pulse voltage) exceeding the threshold value voltage $V_{th}ON$ shown in FIG. 10 at which the electrical memory material (4 layers of polyimide LB film) changes to low resistance state (ON state) was applied. Then, the probe electrode 202 was returned to the recording initiation point, the track 104 was detected and again scanned over the recording layer 103. At this time, Z was controlled to be constant during reading of recording. As the result, in the recording bit, a probe electrode of about 10 nA flowed, thereby indicating the ON state.

The probe voltage was set at 10 V exceeding the threshold value voltage $V_{th}OFF$ at which the electrical memory material changed from the ON state to the OFF state (the second pulse voltage), and again the recording position was traced. As the result, it was confirmed that all the recorded states had been erased to be transitioned to the OFF state. Further, when the error ratio of the reading data was examined by making the reading speed constant, it was rendered possible to be made markedly small as $10^{-7}$, while it was $10^{-4}$ in the prior art example. Since the track can be formed with low step difference owing to small surface unevenness of the recording medium, the Z-axis change of the probe electrode 202 can be suppressed slightly, whereby it has also been confirmed that reading of the information and random access can be done at high speed.

EXAMPLE 14

Example 14 of the present invention is described by referring to FIGS. 19A to 19E.

First, as shown in FIG. 19A, a mica plate is cleaved in the air to form a smooth substrate 11.

Next, as shown in FIG. 19B, a track 104 of 0.1 $\mu$m in width, 1.0 $\mu$m in pitch and 100 Å in depth by a converging ion beam on the smooth matrix 11. The converging ion beam was irradiated under the conditions of an acceleration voltage of 40 KV, an ion current of 14 pA, a dose of $1.0 \times 10^{16}/cm^2$, Au ion.

Next, as shown in FIG. 19C, a film of gold was formed on the smooth substrate 11 to form an electrode layer 102. The electrode layer 102 was formed by maintaining the substrate temperature at room temperature under the conditions of a vapor deposition speed of 10 Å/sec, a reaching pressure of $2 \times 10^{-6}$/Torr and a film thickness of 5000 Å.

Next, as shown in FIG. 19D, with the use of a Si wafer as the substrate 101, while maintaining it at a constant temperature by heating with a heater, and then lightly rubbing the surface of the electrode layer 102 against the substrate 101, the electrode layer 102 and the substrate 101 are eutectic bonded to each other. The bonding was effected by maintaining the substrate temperature at 400° C., under the conditions of a pressurizing force of 2 kg/cm$^2$ and a maintenance time of 1 minute.

Next, as shown in FIG. 19E, the smooth substrate 11 was peeled off from the electrode layer 102 to obtain a smooth electrode substrate comprising the substrate 101, the electrode layer 102, the track 104. When the surface of the smooth electrode substrate thus obtained was observed by STM, the surface unevenness was 1 nm or less in 10 $\mu$m□.

Next, as shown in FIG. 19F, a polyimide LB film of 4 layers was formed on the smooth electrode substrate to provide a recording layer.

Next, by use of the recording medium prepared according to the process as described above, the surface shape was examined by means of the information processing device shown in FIG. 7, the recording medium surface was found to reflect the smoothness of the electrode and the track 104, with the track 104 being formed to a height of 50 Å, and the surface unevenness except for the track 104 1 nm or less in 10 $\mu$m□. Therefore, the track 104 could be clearly distinguished.

Next, the experiments of recording, reproducing, erasing were conducted, and it was confirmed that recording, reproducing and erasing could be done similarly as in Example 13.

EXAMPLE 15

Example 15 of the present invention is described by referring to FIGS. 20A to 20F.

Figure 20A:

First, as shown in FIG. 20A, a mica plate is cleaved in the air to form a smooth matrix 11.

Figure 20B:
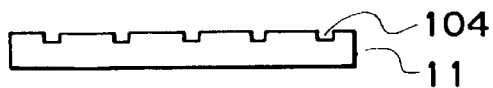

Next, as shown in FIG. 20B, a track 104 of 0.1 $\mu$m in width, 1.0 $\mu$m in pitch and 100 Å in depth by a converging ion beam on the smooth matrix 11. A converging ion beam was irradiated under the conditions of an acceleration voltage of 40 KV, an ion current of 14 pA, a dose of $1.0 \times 10^{16}/cm^2$, Au ion.

Figure 20C:
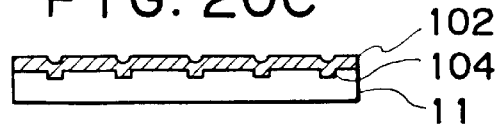

Next, as shown in FIG. 20C, a film of Au—Pd was formed on the smooth matrix 11 according to the vacuum vapor deposition method to form an electrode layer 102. The electrode layer 102 was formed by maintaining the substrate temperature at room temperature under the conditions of a vapor deposition speed of 10 Å/sec, a reaching pressure of $2 \times 10^{-6}$/Torr and a film thickness of 1000 Å.

Figure 20D:
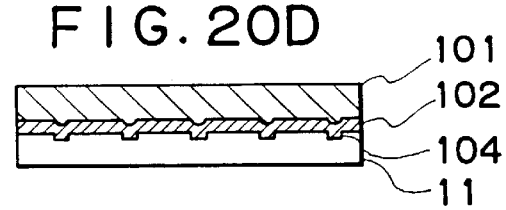

Next, as shown in FIG. 20D, on the electrode layer 102 was formed nickel by electroforming to provide a substrate 101. The electroforming was carried out by use of a Watt bath under the conditions of a temperature maintained at 50° C., a current density of 0.06 A/cm$^2$ and an electroforming time of 2 hours to obtain a thickness of 100 $\mu$m.

Figure 20E:
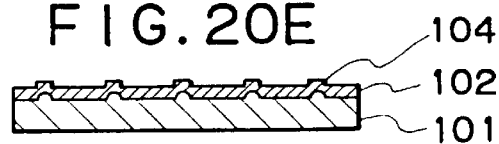

Next, as shown in FIG. 20E, the smooth substrate 11 was peeled off from the electrode layer 102 to obtain a smooth electrode substrate comprising the substrate 101, the electrode layer 102, the track 104. When the surface of the smooth electrode substrate thus obtained was observed by STM, the surface unevenness except for the track 104 was 1 nm or less in 10 $\mu$m□.

Figure 20F:
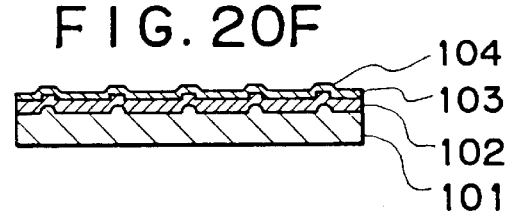

Next, as shown in FIG. 20F, a polyimide LB film of 4 layers was formed on the smooth electrode substrate to provide a recording layer 103.

Next, by use of the recording medium prepared according to the process as described above, the surface shape was examined by means of the information processing device shown in FIG. 7. As the result, the recording medium surface was found to reflect the smoothness and the track 104, with the track 104 being formed to a height of 50 Å, and the surface unevenness except for the track 104 was 1 nm or less in 10 $\mu$m□. Therefore, the track 104 could be distinguished clearly.

Next, the experiments of recording, reproducing and erasing were conducted, and it was confirmed that recording, reproducing and erasing could be done similarly as in Example 13.

EXAMPLE 16

Example 16 of the present invention is described by referring to FIGS. 21A to 21G.

Figure 21A:
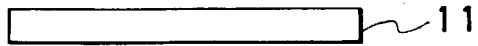

First, as shown in FIG. 21A, mica plate is cleaved in the air to form a smooth substrate 11.

Figure 21B:
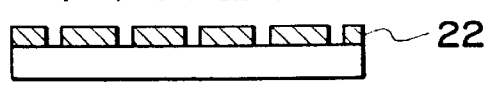

Next, as shown in FIG. 21B, a resist pattern 22 is formed on the smooth substrate 11 according to conventional photolithographic process. For the resist pattern 22, RD-2000N (manufactured by Hitachi Kasei) was employed.

Figure 21C:
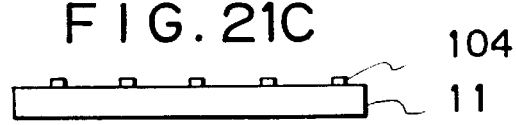

Next, as shown in FIG. 21C, $SiO_2$ was vapor deposited with a film thickness of 50 Å and a track 104 was formed by use of the lift-off method.

Figure 21D:
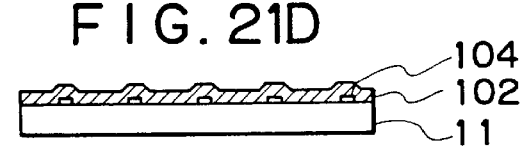

Next, as shown in FIG. 21D, a film of gold was formed on the smooth substrate 11 including the track 104 to form an electrode layer 102. The electrode layer 102 was formed by maintaining the substrate temperature at room temperature under the conditions of a vapor deposition speed of 10 Å/sec, a reaching pressure of $2\times10^{-6}$/Torr and a film thickness of 5000 Å.

Figure 21E:
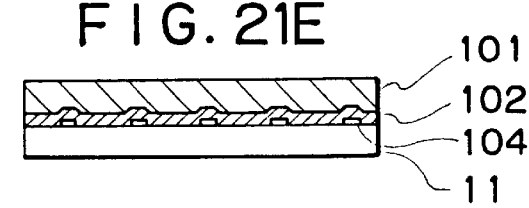

Next, as shown in FIG. 21E, on the electrode layer 102 was formed nickel by electroforming to provide a substrate 101. The electroforming was carried out by use of a Watt bath under the conditions of a temperature maintained at 50° C., a current density of 0.06 A/cm² and an electroforming time of 2 hours to obtain a thickness of 100 $\mu$m.

Figure 21F:
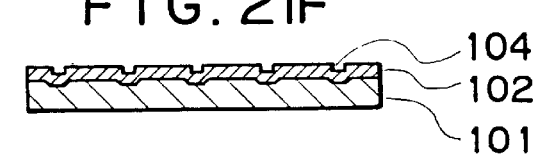

Next, as shown in FIG. 21F, the smooth substrate 11 was peeled off from the electrode layer 102 to obtain a smooth electrode substrate comprising the substrate 101, the electrode layer 102, the track 104. When the surface of the smooth electrode substrate thus obtained was observed by STM, the surface unevenness except for the track 104 was 1 nm or less in 10 $\mu$m□.

Figure 21G:
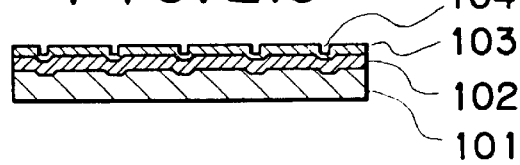

Next, as shown in FIG. 21G, a polyimide LB film of 4 layers was formed on the smooth electrode substrate to provide a recording layer 103.

Next, by use of the recording medium prepared according to the process as described above, the surface shape was examined by means of the information processing device shown in FIG. 7. As the result, the recording medium surface was found to reflect the smoothness of the electrode and the track 104, with the track 104 being formed to a height of 50 Å, and the surface unevenness except for the track 104 was 1 nm or less in 10 $\mu$m□. Therefore, the track 104 could be distinguished clearly.

Next, the experiments of recording, reproducing and erasing were conducted, and it was confirmed that recording, reproducing and erasing could be done similarly as in Example 13.

EXAMPLE 17

In this Example, the recording medium of the type shown in FIG. 22 was prepared. First, as shown in FIG. 24B one layer of a polyisobutyl methacrylate (PIBM) 408 was deposited on a molten quartz substrate 407 according to the Langmuir-Blodgett's method (LB method). The thickness of one layer was about 10 Å.

In the following, the method for preparing the monomolecular film of PIBM is described. PIBM was dissolved in chloroform and the concentration adjusted to 1 g/l. The solution was spread on an aqueous phase comprising pure water of a water temperature of 20° C., and a monomolecular film formed on the water surface. The surface pressure was enhanced up to 12 mN/m, and the washed molten quartz substrate 407 dipped previously into the aqueous phase was drawn up at 5 mm/min. to form a monomolecular film of PIBM.

As shown in FIG. 24C, the thin film 408 was subjected to picture drawing by means of an EB exposure device (Elionics, ELS-3300) at an acceleration voltage of 30 kV, a dose of 100 $\mu$C/cm². Developing was carried out with isopropyl alcohol/water (85/15). Subsequently, as shown in FIG. 24D, a film of Au 402 was formed to a thickness of 1500 Å according to the vacuum vapor deposition method. Then, as shown in FIG. 24E, the glass substrate (Corning #7059) 401 was coated with a minute amount of an adhesive (Konishi Bond Hitemp HT-10) and adhered to the Au surface of a substrate having Au vapor deposited thereon. The adhesion pressure was maintained at 0.5 kg/cm2, and the composite was left to stand while heated to 120° C. for 2 days. As shown in FIG. 24F, when both substrates 402 and 407 were peeled off, a recording medium having a track 405 subjected to patterning with the surface state of the molten quartz substrate and the PIBM monomolecular film subjected to patterning being maintained could be obtained.

Observation was performed by use of STM. The track had a width as set. The track groove depth was found to be about 8 Å. The medium was scanned with a probe similarly as during recording and reproducing by use of STM under the state with the displacement amount of Z-axis of the probe being made small relative to the change in the current detected by making the feed back control in the Z-axis direction of the probe gentle. As the result, the current could be detected with the probe even when the probe came to the position of the groove for tracking.

EXAMPLE 18

A recording medium was obtained in the same manner as in Example 17 except that 2 layers of PIBM were deposited. The track had a width as set. The track groove depth was found to be about 18 Å. The medium was scanned with a probe similarly as during recording and reproducing by use of STM under the state with the displacement amount of Z-axis of the probe being made small relative to the change in the current detected by making the feed back control in the Z-axis direction of the probe gentle. As the result, the current could be detected with the probe even when the probe came to the position of the groove for tracking.

EXAMPLE 19

In this Example, the recording medium of the type shown in FIG. 22 was prepared. First, as shown in FIG. 24B, by use of a polyamic acid (PAAD-DDE/PAA) obtained by polymerization of 4,4'-diaminodiphenyl ether and pyromellitic acid anhydride, a monomolecular built-up film of 2 layer 408 was formed on a molten quartz substrate 407 according to the Langmuir-Blodgett's method. One layer had a thickness of about 15 Å.

In the following, the preparation method of the monomolecular film of PAAD-DDE/PAA is described. Into a solution of PAAD-DDE/PAA in dimethylacetamide (DMAC) (concentration calculated on monomer: $1\times10^{-3}$ mol/l) was added N,N-dimethylhexadecylamine (DHDA) at a ratio of 2 relative to 1 equivalent of the repeating units of PAAD-DDE/PAA to prepare a PAAD-DDE/PAA/DHDA solution. The solution was spread on an aqueous phase comprising pure water of a water temperature of 20° C. to form a monomolecular film on the water surface.

The thin film was subjected to picture drawing by means of an EB exposure device (Elionics, ELS-3300) at an acceleration voltage of 30 kV, a dose of 60 $\mu$C/cm²). Developing was carried out with DMAC and calcination conducted at 150° C. for 2 hours to imidate the polyamic acid to a polyimide (PI-DDE/PAA). The polyimide obtained at this time had a thickness of about 5 Å for one layer.

Subsequently, as shown in FIG. 24D a film of Au 402 with a thickness of 1500 Å was formed at a vapor deposition speed of 25 Å/sec. according to the vacuum vapor deposition method. Then, the glass substrate (Corning #7059) 401 was coated with a minute amount of an adhesive (Konishi Bond Hitemp HT-10) and adhered to the Au surface 402 of a substrate having Au vapor deposited thereon. The adhesion pressure was maintained at 0.5 kg/cm$^2$, and the composite was left to stand while heated to 120° C. for 2 days. As shown in FIG. 24F, when both substrates (402, 407) were peeled off, a recording medium having a track subjected to patterning with the surface state of the molten quartz substrate and the polyimide LB film subjected to patterning being maintained could be obtained.

Observation was performed by use of STM. The track had a width as set. The track groove depth was found to be about 8 Å. The medium was scanned with a probe similarly as in recording and reproducing by use of STM under the state with the displacement amount of Z-axis of the probe being made small relative to the change in the current detected by making the feed back control in the Z-axis direction of the probe gentle. As the result, the current could be detected with the probe even when the probe came to the position of the groove for tracking.

EXAMPLE 20

A recording medium was obtained in the same manner as in Example 19 except that the thin film obtained was subjected to picture drawing by an EB exposure device (Elionics, ELS-3300) at an acceleration voltage of 30 kV, a dose amount of 60 µc/cm$^2$ and the portion exposed with the electron beam was imidated to obtain an organic monomolecular film having a step difference. The track had a width as set. The track groove depth was found to be about 10 Å. The medium was scanned with a probe similarly as in recording and reproducing by use of STM under the state with the displacement amount of Z-axis of the probe being made small relative to the change in the current detected by making the feed back control in the Z-axis direction of the probe gentle. As the result, the current could be detected with the probe even when the probe came to the position of the groove for tracking.

EXAMPLE 21

Example 17 was repeated except that the vapor deposition speed of Au in Example 17 was changed from 25 Å/sec to 1 Å/sec. As the result, the same results as in Example 17 were obtained.

EXAMPLE 22

Example 17 was repeated except that the adhesive was change from Konishi Bond Hitemp HT-10 to a 10 hour curable type two-liquid mixing epoxy type adhesive (Konishi Bond E set). The same results as in Example 17 were obtained.

EXAMPLE 23

Example 17 was repeated except that mica was employed in place of the molten quartz used in Example 1. The same results as in Example 17 were obtained.

EXAMPLE 24

A recording medium was obtained in the same manner as in Example 17, except that a UV-ray with a wavelength of 250 nm was irradiated on the thin film through a pattern by a UV-ray exposure device (PLA-521FA, manufactured by Canon). The same results as in Example 17 were obtained.

EXAMPLE 25

A recording medium was obtained in the same manner as in Example 17 except for using a Si substrate having SiO$_2$ with a thickness of 1 µm in place of the molten quartz substrate used in Example 17. The same results as in Example 17 were obtained.

EXAMPLE 26

The experiments of recording and reproducing were conducted by use of the recording medium obtained in Example 17.

The recording and reproducing device shown in FIG. 7 was used, and tungsten subjected to electrolytic polishing for the probe electrode. The probe electrode was controlled by fine adjustment of the distance (Z) from the surface of the recording layer by a piezoelectric element so that the current may be constantly maintained. Further, the fine control adjustment mechanism is designed so that it can be controlled with fine adjustment also in the interplanar (X, Y) direction while maintaining constantly the distance (Z).

Also, the probe electrode can directly perform recording and reproducing. The recording medium is placed on an XY stage of high precision, and can be moved to any desired position. The recording medium described above was placed on the XY stage. Next, a voltage of 1 V was applied between the probe electrode and the recording medium, and the distance (Z) between the probe electrode and the recording layer surface was adjusted. At this time, the probe current Ip for controlling the distance Z between the probe electrode and the recording layer surface was set so that it became $10^{-10} A \geq Ip \geq 10^{-11} A$. Next, an information was recorded at 100 Å while scanning the probe electrode on the track. The information was recorded by applying a rectangular pulse voltage of 10V, 5 µsec., with the probe electrode being made the + side and the substrate electrode the − side.

When the recording surface was observed by use of STM, a projection having a height of several Å was found to be formed at the recording position. Then, the probe electrode was returned to the recording initiation point, and again scanned on the recording layer. At this time, in reading of recording, Z was set so as to become substantially constant. As the result, in the recording bit, a probe current of about 10 nA flowed. Whereby the recording could be reproduced.

EXAMPLE 27

Similarly as in Example 26, the distance Z between the probe electrode and the recording layer surface was controlled. Then, the probe electrode was initially set so as to be coincident with the standard marker. By moving the probe for a predetermined distance from the standard marker, and scanning it on the recording surface in the vertical direction to the track groove direction, an information was recorded at 100 Å pitch. At the stage when a plurality of recording bits was formed, the probe electrode was returned to the original position. Further, the probe electrode was moved along 200 Å track, thereby to effect similarly recording of an information. This was performed repeatedly. For recording of the information, a rectangular pulse voltage of 4 V, 50 µsec was applied with the probe electrode being made the + side, and the substrate electrode the − side.

When the recording surface was observed by use of STM, a projection having a height of several Å was found to be formed at the recording position.

The track was also observed. Then, similarly as during recording, it was initially set so as to be consistent with the standard marker previously provided with the probe electrode. Along the track from the standard mark, movement was made for the distance equal to that moved during recording. The information was reproduced by scanning on the recording surface vertical to the track groove direction while applying gently a feedback in of the Z-axis. Having moved for at least the distance for reading all of the recording bits, the probe electrode was determined to the track at the stage when the movement was completed. For investigating where it is possible to apply feedback to the Z-axis of the probe electrode, after detection of the track, further movement of several nm was effected in the same direction, namely tracking error was intentionally caused to occur. As the result, a current from the track groove bottom could be sufficiently detected. From this, it has been found that the absolute position of the probe electrode from the recording surface relative to the Z-axis space can be always known. Then, the probe electrode was returned to the recording initiation point, and again scanned on the recording layer. At this time, in the reading of the recording, setting was made so that Z became substantially constant. As the result, in the recording bit, a probe current of about 10 nA flowed, whereby recording could be reproduced.

EXAMPLE 28

The experiments were conducted in the same manner as in Example 26 except for using a platinum probe in place of the tungsten probe electrode used in Example 26. The results were the same as in Example 26.

EXAMPLE 29

In this Example, a recording medium of the type shown in FIG. 23 was prepared.

As shown in FIG. 24G, on the electrode substrate obtained in Example 17 was formed a Langmuir-Blodgett's film of PI-DDE/PAA as the recording layer 403. In the following the preparation method of the PI-DDE/PAA LB film is described.

The monomolecular film of PI-DDE/PPA was built up according to the film formation method as described in Example 2 on the electrode substrate equipped with the track as described above to build up two layers. By heating the thin film to 150° C. to form the recording layer 403, a recording medium in the recording and reproducing device which reads the current value by approximating the probe could be obtained. By use of the recording medium, the experiments of recording, reproducing and erasing were conducted.

As the probe electrode, one made of platinum was employed. The probe electrode controls the distance (Z) from the surface of the recording layer, and its distance (Z) is controlled by fine adjustment. Further, the fine adjustment mechanism is designed so that fine adjustment may also be possible in the interplanar direction (X, Y) while constantly maintaining the distance (Z).

The probe can also directly perform recording, reproducing and erasing. The recording medium is placed on an XY stage of high precision, and can be moved to any desired position. The recording medium as described above was place on the XY stage. Next, a voltage of 1.5 V was applied between the probe electrode and the recording medium, and the distance (Z) between the probe electrode and the recording layer surface was adjusted while monitoring the current. At this time, the probe electrode Ip for controlling the distance Z between the probe electrode and the recording layer surface was set so as to become $10^{-10} A \geq Ip \geq 10^{-11} A$. Next, an information was recorded at 100 Å pitch while scanning the probe electrode on the track. For recording of the information, a rectangular pulse voltage of the threshold voltage $V_{th}$ or higher shown in FIG. 10 at which the electrical memory material (polyimide thin film recording layer) changes to the low resistance state (ON state) with the probe electrode being made the + side and the substrate electrode the − side. Then, the probe electrode was returned to the recording initiation point, and again scanned on the recording layer. At this time, Z was controlled to be constant during reading of recording. As the result, in the recording bit, a probe current of about 10 nA flowed to indicate the ON state. Further the threshold voltage $V_{th}$ OFF at which the electrical memory material changes from the ON state to the OFF state was set up to 10 V, which value is greater than $V_{th}$ OFF, and then the recording position was traced again. As the result, it was confirmed that all the recording was erased to be transitioned to the OFF state. Further, the probe electrode was returned again to the recording initiation point as described above, and rerecording was performed simultaneously with the recording method as described above. The probe electrode was returned to the rerecording initiation point, and reading of the recording was performed by scanning on the recording layer. In the recording bit, a current of about 10 nA flowed similarly as described above to confirm the ON state.

The same results were also obtained in the case when a tungsten wire subjected to electrolytic polishing was used as the probe in place of one made of platinum.

As described above, according to the recording medium of the present invention, by transferring the surface shape possessed by a smooth substrate, it has been rendered possible to form a recording medium having the surface with surface unevenness of 1 nm in 1 $\mu m \square$ or more.

Further, the recording medium according to the present invention has the following effects.

(1) Since the surface shape of the matrix can be transferred, it has become possible to form a smooth surface at any desired place on the substrate, whereby formation of standard markers, etc. can also be done at the same time.

(2) Since the electrode layer can be plastered onto a substrate after formation on a matrix, any material and form can be used for the substrate. For example, a control circuit for writing and reading is assembled on a Si chip, and the recording medium of the present invention is formed with the chip as the substrate. By this, a recording medium having the control circuit for writing and reading, and the recording layer formed integrally can be provided.

By applying the recent micromechanical technique, a driving actuator can be assembled on a Si chip and the electrode layer of the present invention provided on the actuator to provide a recording medium equipped with a fine movement mechanism.

Further, by use of such recording medium, the error ratio of reading data can be markedly lowered to enable high speed reproducing.

As described above, according to the embedded electrode and the preparation process thereof, (1) because of the fact that the insulating supporting substrate surface in which the metal electrode is embedded and the exposed surface of said metal electrode are on the same plane, the electrode can be formed to be thick without formation of a stepped difference, whereby an electrode without risk of self-heat generation of large current capacity can be provided;

(2) further, because of high smoothness of the electrode surface, it has become possible to form a lamination type element with good uniformity;

(3) it has rendered possible to easily form such embedded electrode.

As described above, according to the preparation process of the peeling film of the present invention.

(1) in the case that the matrix has a smooth surface with surface unevenness of 1 nm or less in 1 μm☐ or more, faithful transfer duplication maintaining the same difference in height is rendered possible, and at the same time the restriction with respect to the matrix and the material of the duplicated product have been removed to a great extent;

(2) by such transfer duplication technique, it has become possible to produce recording media for high density information recording having high smoothness by use of various metals and metal compound materials;

(3) further, transfer onto a highly hard metal compound has been rendered possible, thereby enabling formation of a molding matrix of recording medium.

As described above, the present invention has the following advantages.

(1) By transferring the surface shape possessed by the substrate, the surface unevenness except for the track becomes 1 nm or less, whereby a recording medium with the track being clearly distinguishable can be formed.

Further, by use of such recording medium, the error ratio of reading data can be markedly lowered, and also the monitoring precision can be markedly improved to enable high speed reproducing.

(2) During recording reproducing, even if a tracking error such that the probe is stopped on the bottom of the track groove may occur, restoration can be done easily.

(3) When positioned at the upper parts of the track groove during access, it becomes possible to avoid contact with the track groove wall during scanning.

When forming the track groove, an LB film subjected patterning is employed, and since the LB film can form a film with smooth surface of several angstroms, and therefore there is also no projection internally of the track groove which is erroneously sensed as the recording bit.

What is claimed is:

1. A process for preparing an electrode substrate, comprising the step of forming an electrode layer containing a conductive material on a smooth matrix with a surface unevenness of 1 nm or less and a size of 1 μm☐ or more and the step of separating said electrode layer from the matrix.

2. A process for preparing an electrode substrate according to claim 1, wherein a crystalline substrate with its main surface being cleaved is used as the matrix.

3. A process for preparing an electrode substrate according to claim 1, wherein a glass with main surface formed by melting is used as the matrix.

4. A process for preparing an electrode substrate according to claim 1, wherein the conductive material is a noble metal or an alloy of noble metals.

\* \* \* \* \*

UNITED STATES PATENT AND TRADEMARK OFFICE
CERTIFICATE OF CORRECTION

PATENT NO.  : 6,308,405 B1
DATED       : October 30, 2001
INVENTOR(S) : Osamu Takamatsu It is certified that error appears in the above-identified patent and that said Letters Patent is hereby corrected as shown below:

<u>Column 34,</u>
Line 23, "A" has been changed to read -- The --.

Signed and Sealed this

Third Day of June, 2003

JAMES E. ROGAN
*Director of the United States Patent and Trademark Office*